Feb. 13, 1945.   G. F. DALY ET AL   2,369,441
PAPER FEEDING DEVICE
Filed July 24, 1940   22 Sheets-Sheet 1

Figures 2, 3:
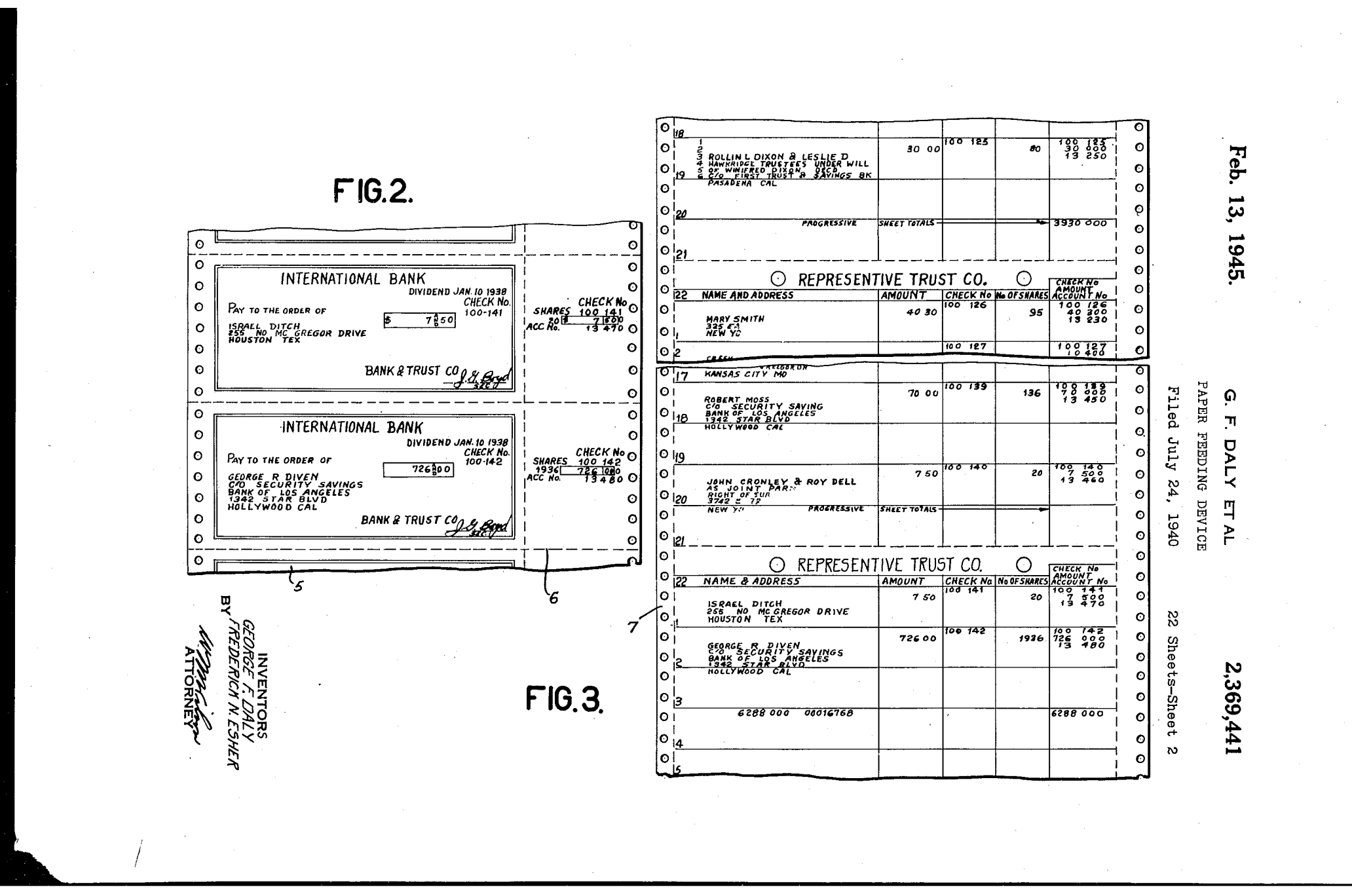

Feb. 13, 1945.   G. F. DALY ET AL   2,369,441
PAPER FEEDING DEVICE
Filed July 24, 1940   22 Sheets-Sheet 2

INVENTORS
GEORGE F. DALY
FREDERICK N. ESHER
BY
ATTORNEY

Feb. 13, 1945. G. F. DALY ET AL 2,369,441
PAPER FEEDING DEVICE
Filed July 24, 1940 22 Sheets-Sheet 3
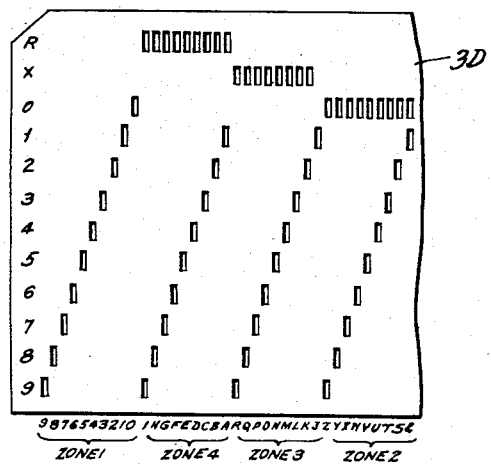
FIG. 3a.
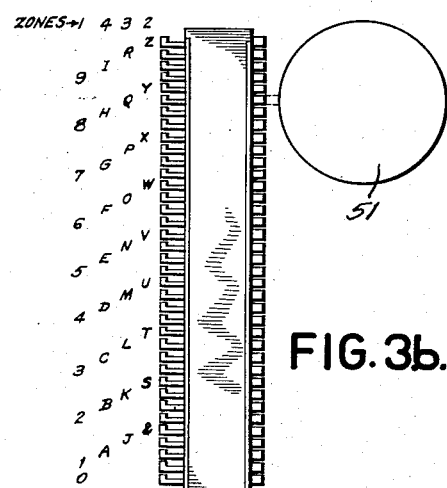
FIG. 3b.
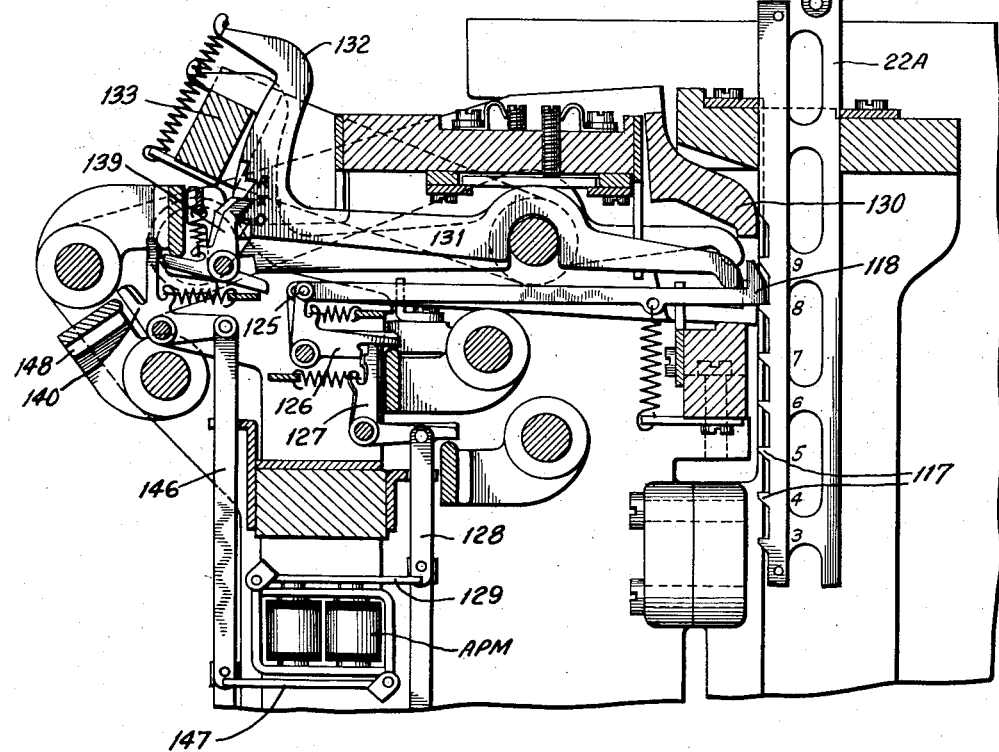
INVENTOR
George F. Daly
BY Frederick N. Ebher
ATTORNEY

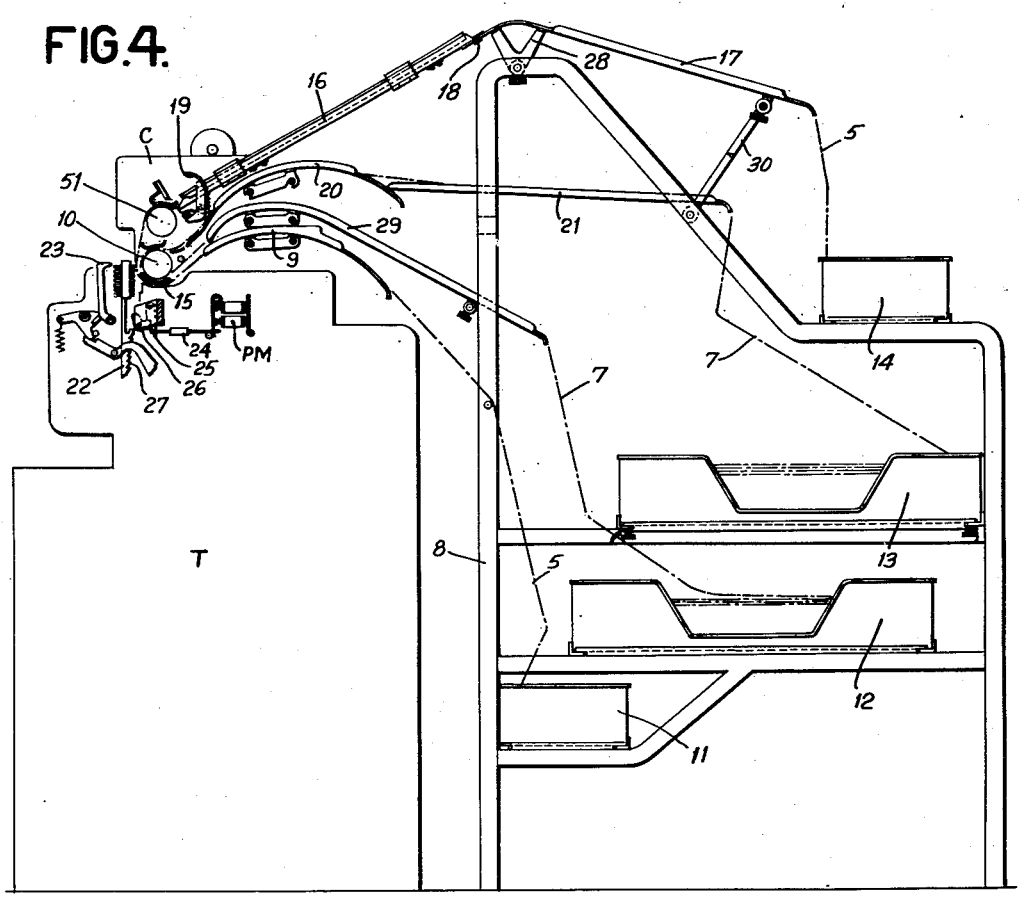

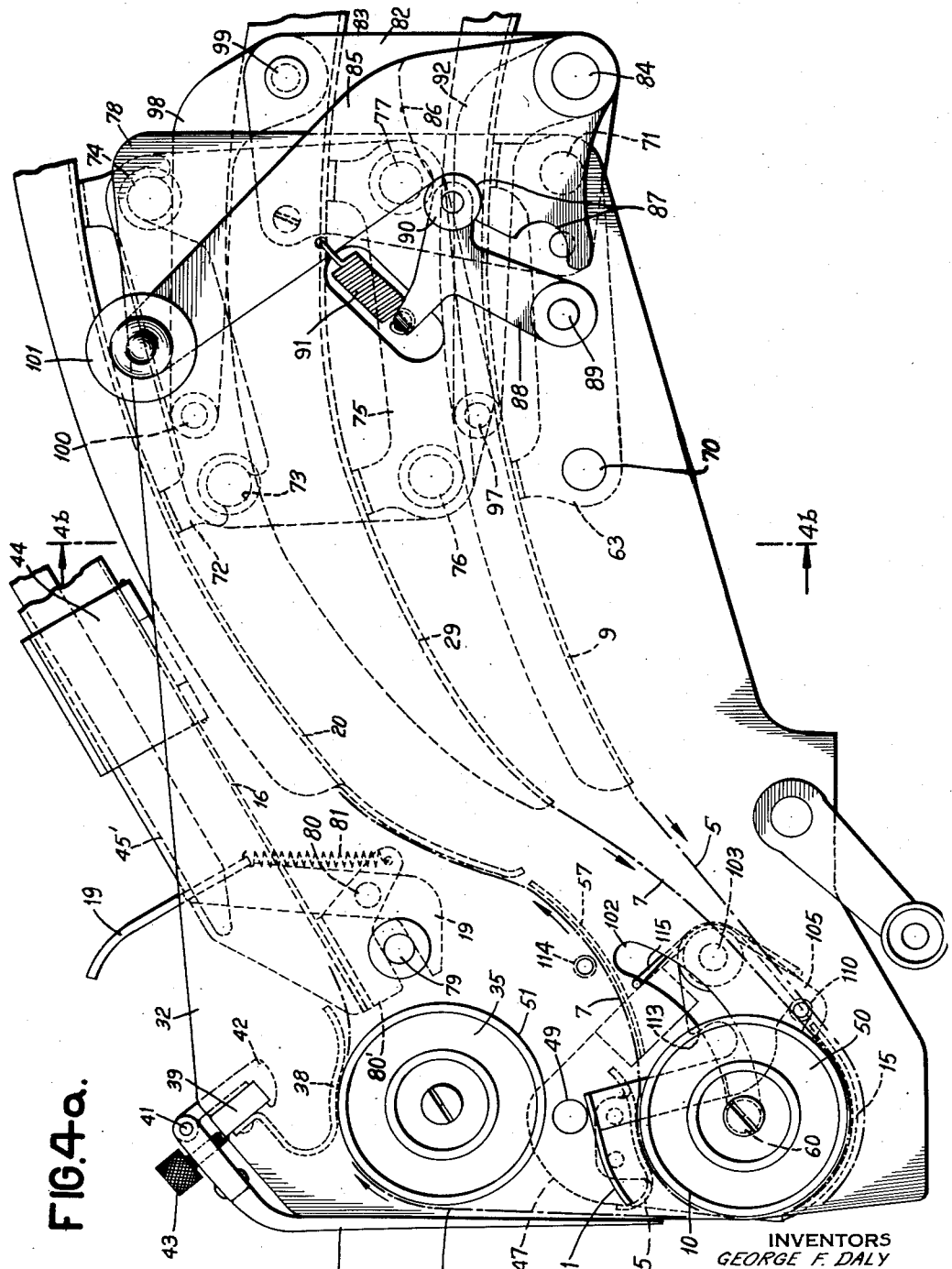

Feb. 13, 1945.  G. F. DALY ET AL  2,369,441
PAPER FEEDING DEVICE
Filed July 24, 1940   22 Sheets-Sheet 6

INVENTORS
GEORGE F. DALY
FREDERICK N. ESHER
BY
ATTORNEY

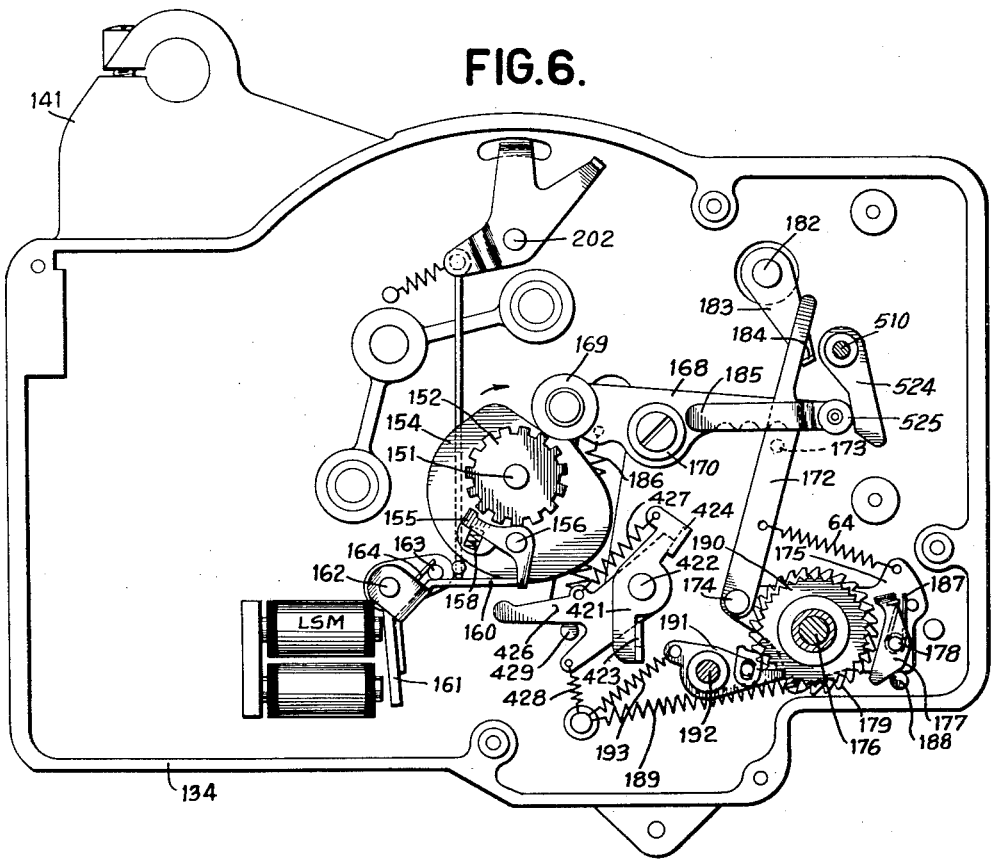

Feb. 13, 1945.   G. F. DALY ET AL   2,369,441
PAPER FEEDING DEVICE
Filed July 24, 1940   22 Sheets-Sheet 8

INVENTORS
GEORGE F. DALY
FREDERICK N. ESHER
BY
ATTORNEY

FIG.11.
FIG.12.
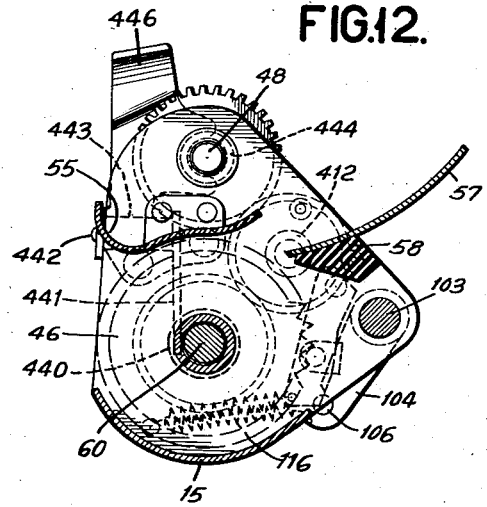
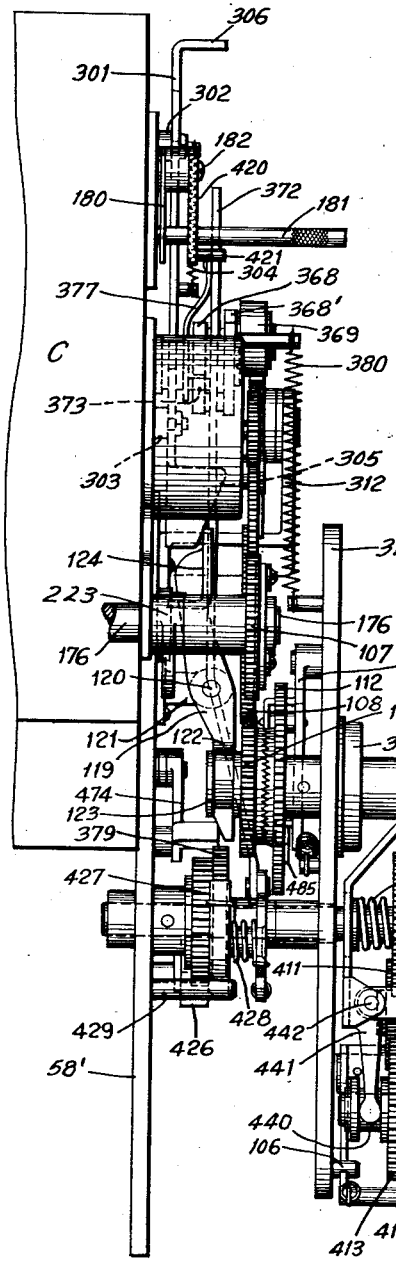
INVENTORS
GEORGE F. DALY.
FREDERICK N. ESHER
BY
ATTORNEY Feb. 13, 1945. G. F. DALY ET AL 2,369,441
PAPER FEEDING DEVICE
Filed July 24, 1940 22 Sheets-Sheet 12

INVENTORS
GEORGE F. DALY
FREDERICK N. ESHER
BY
ATTORNEY

Feb. 13, 1945.  G. F. DALY ET AL  2,369,441
PAPER FEEDING DEVICE
Filed July 24, 1940    22 Sheets-Sheet 13
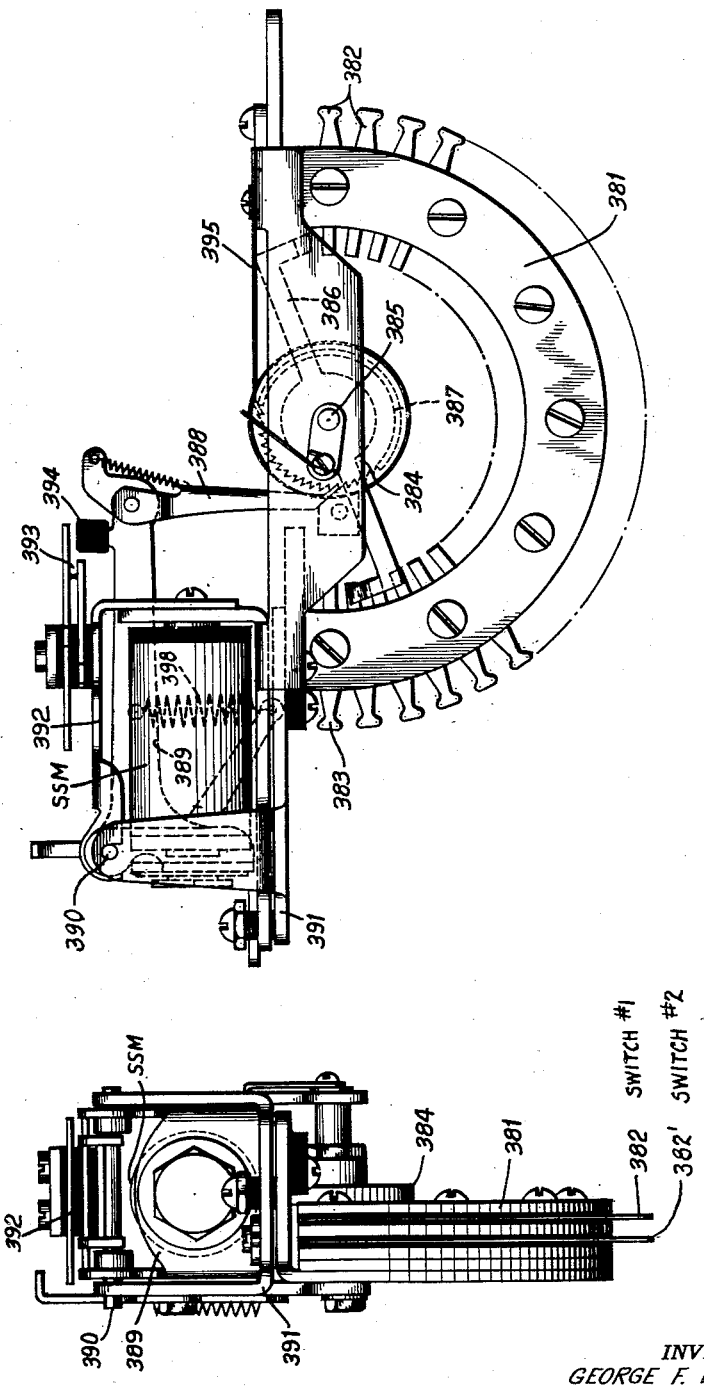
INVENTORS
GEORGE F. DALY
FREDERICK N. ESHER
BY
ATTORNEY.

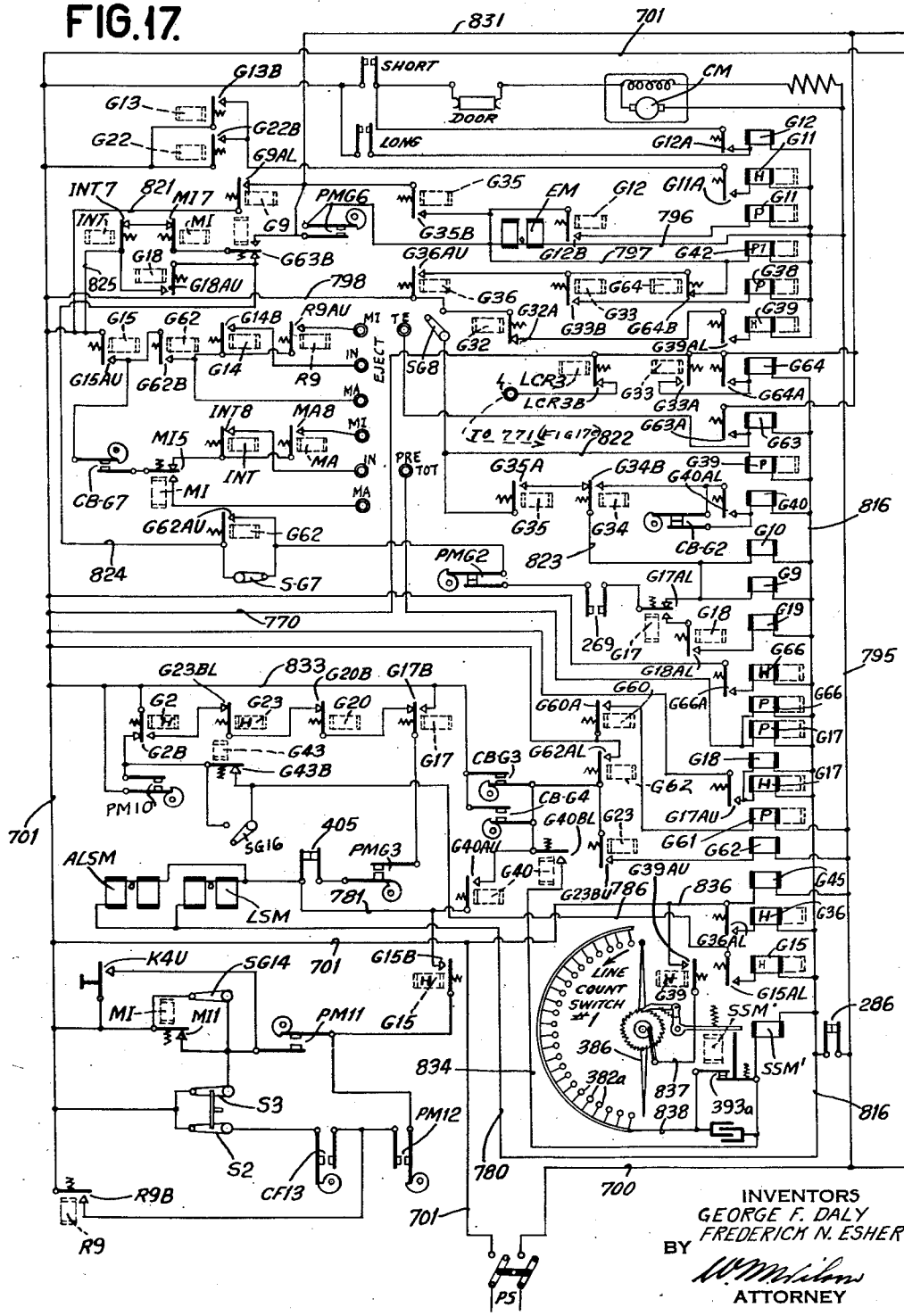

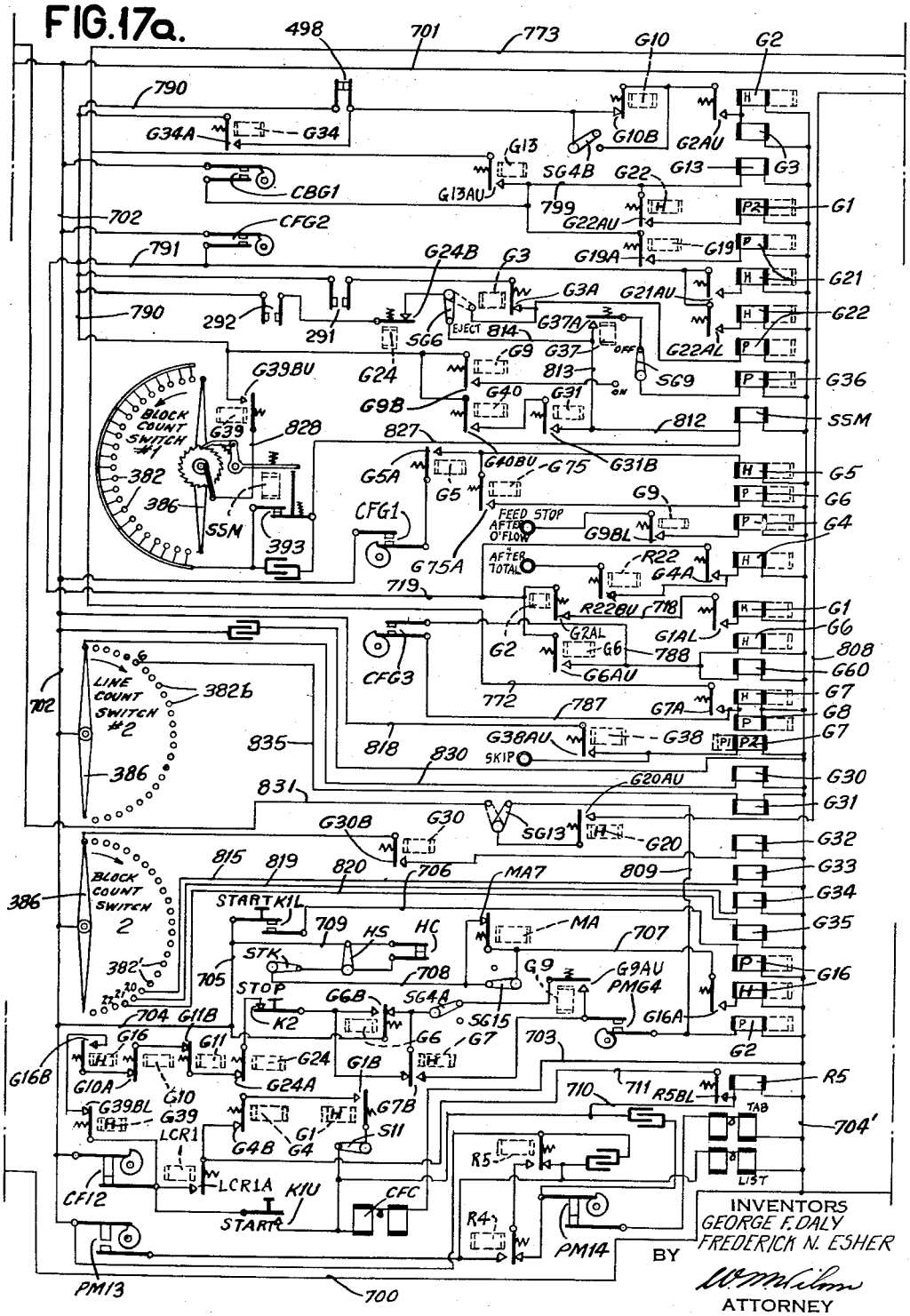

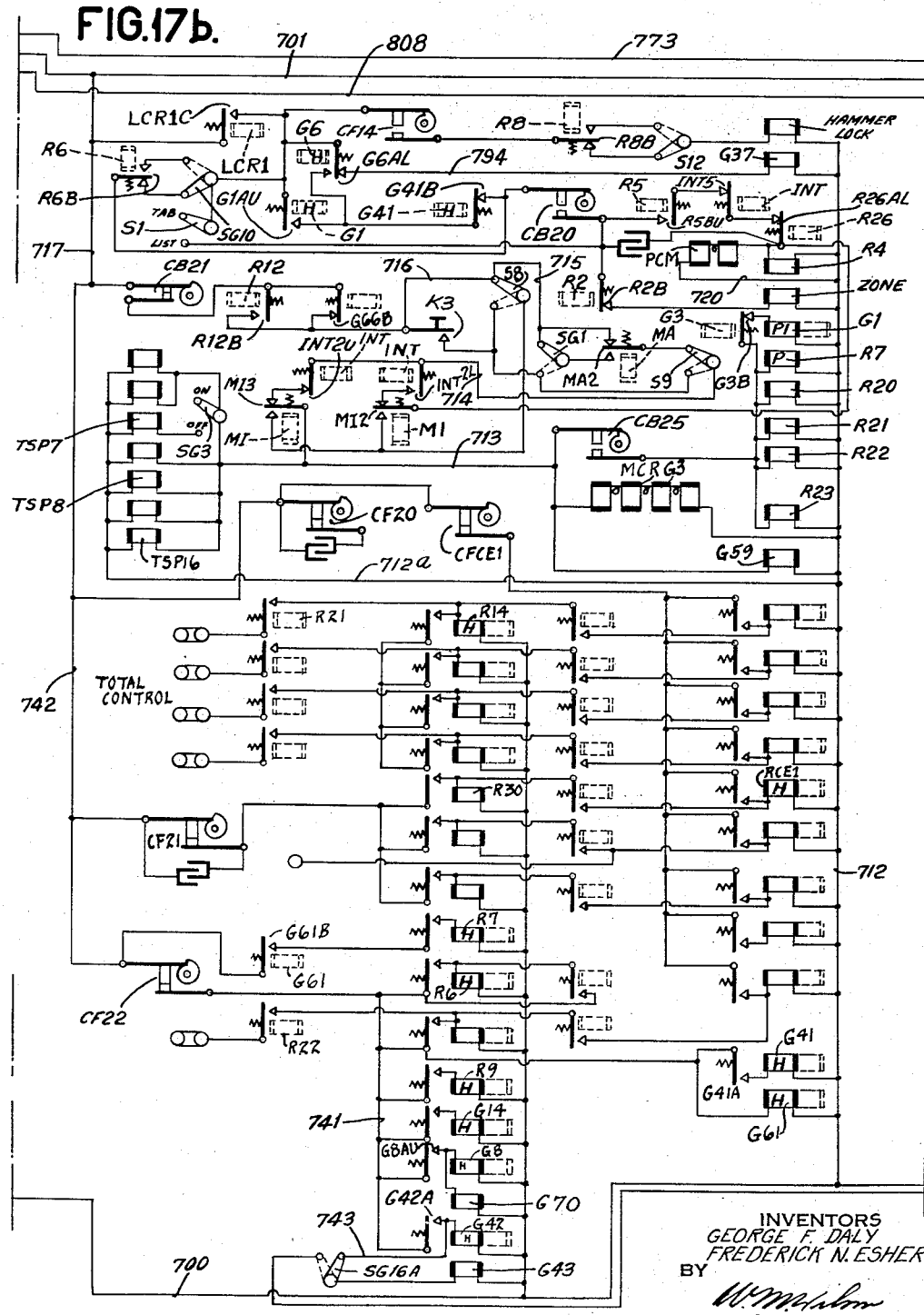

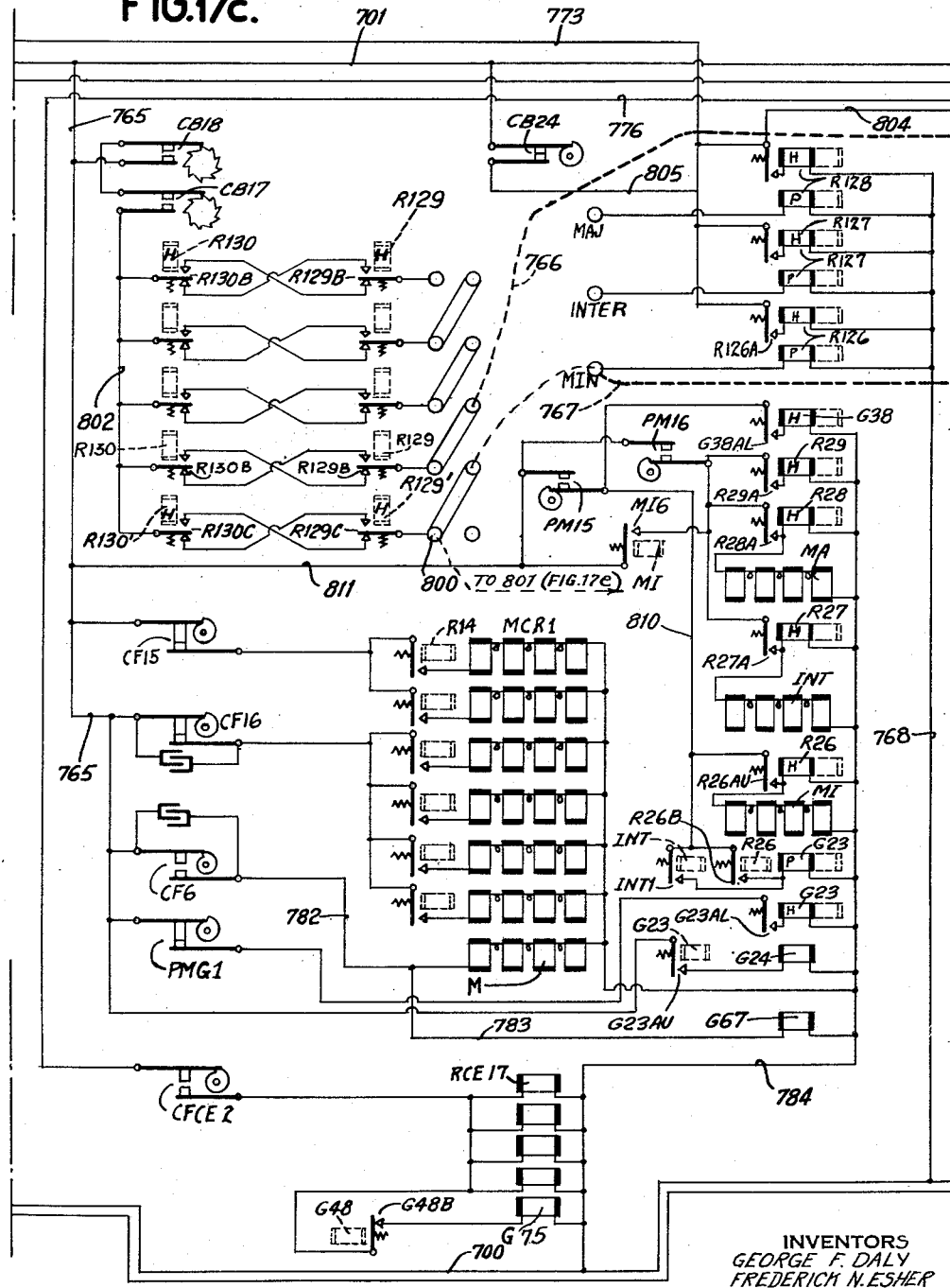

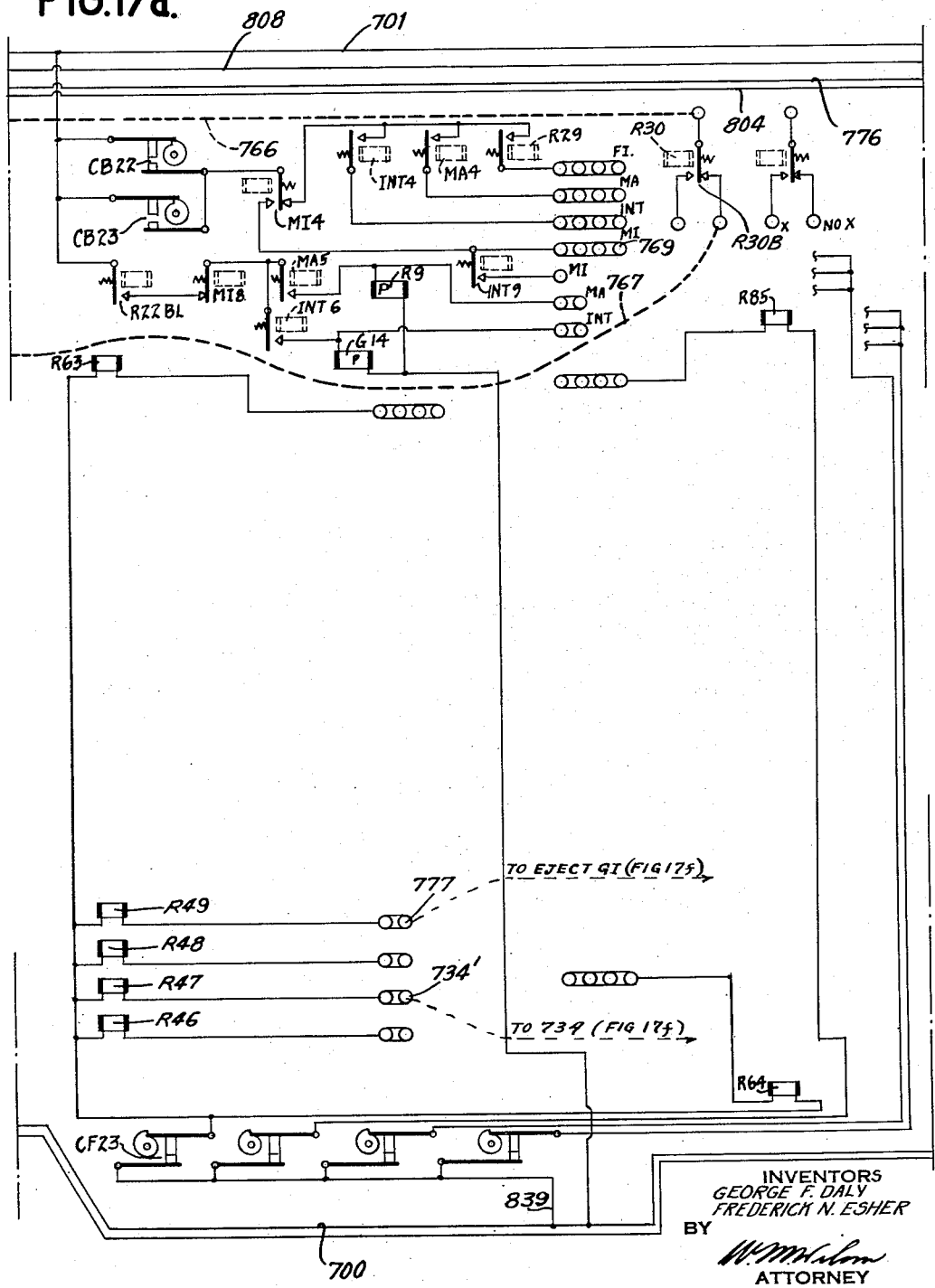

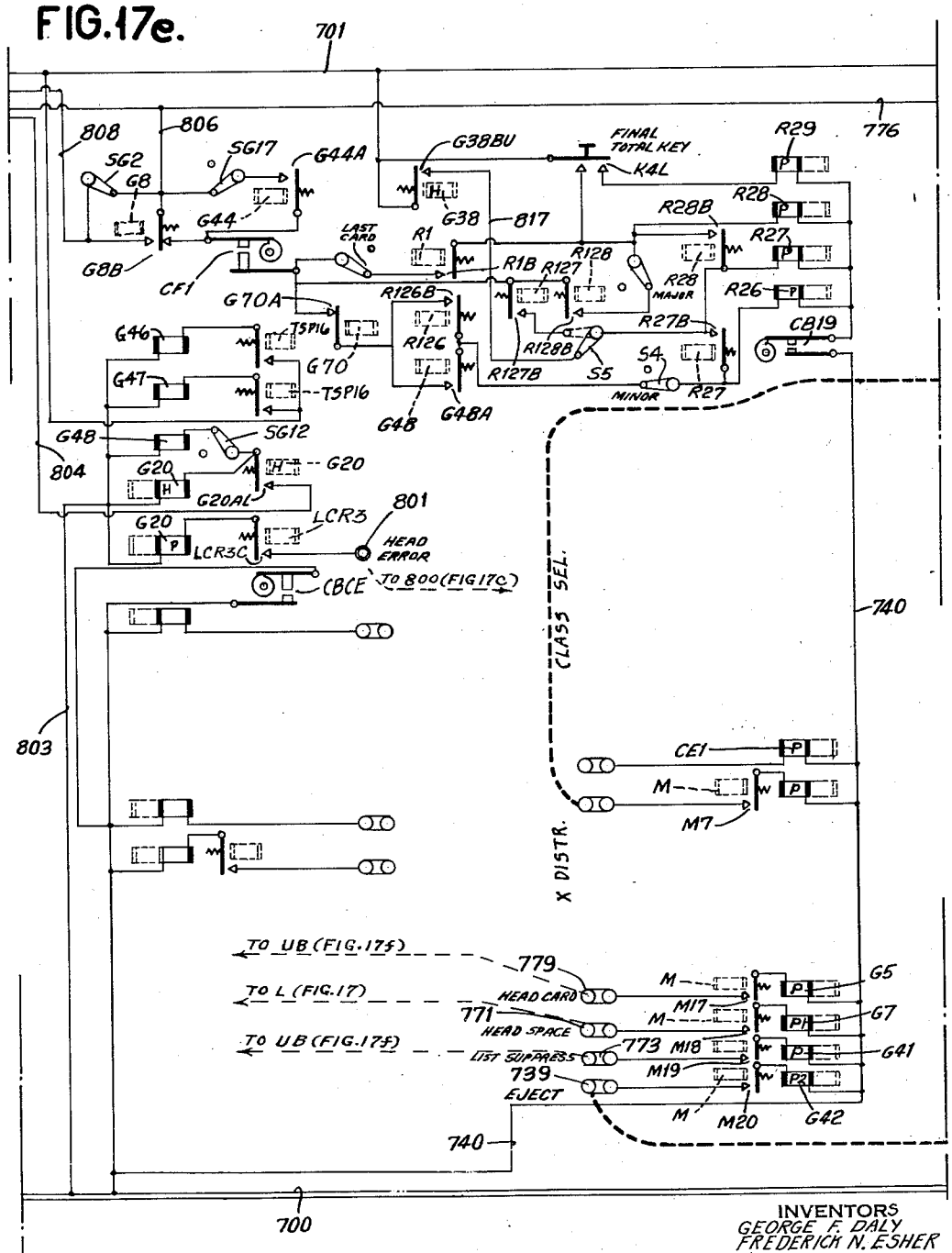

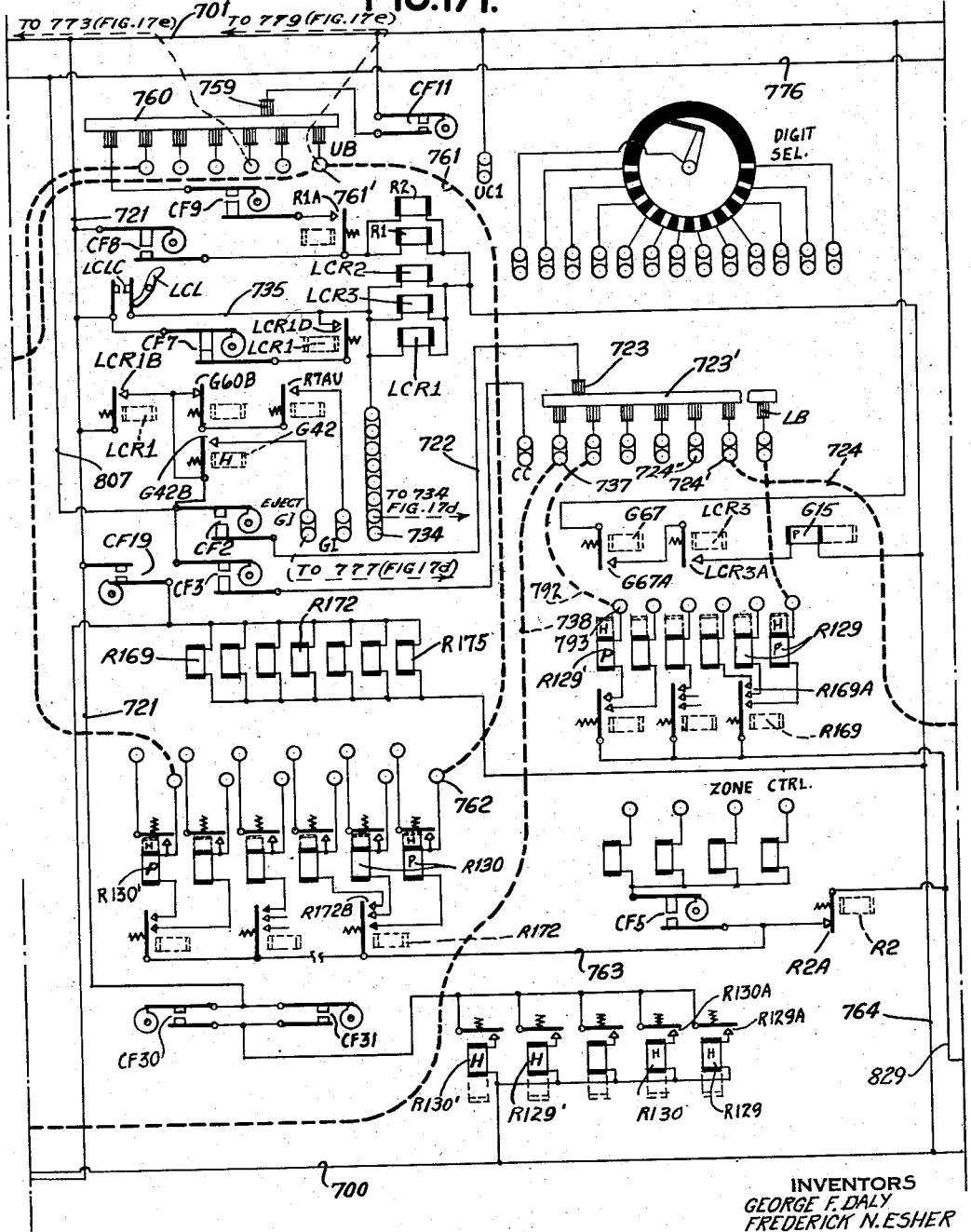

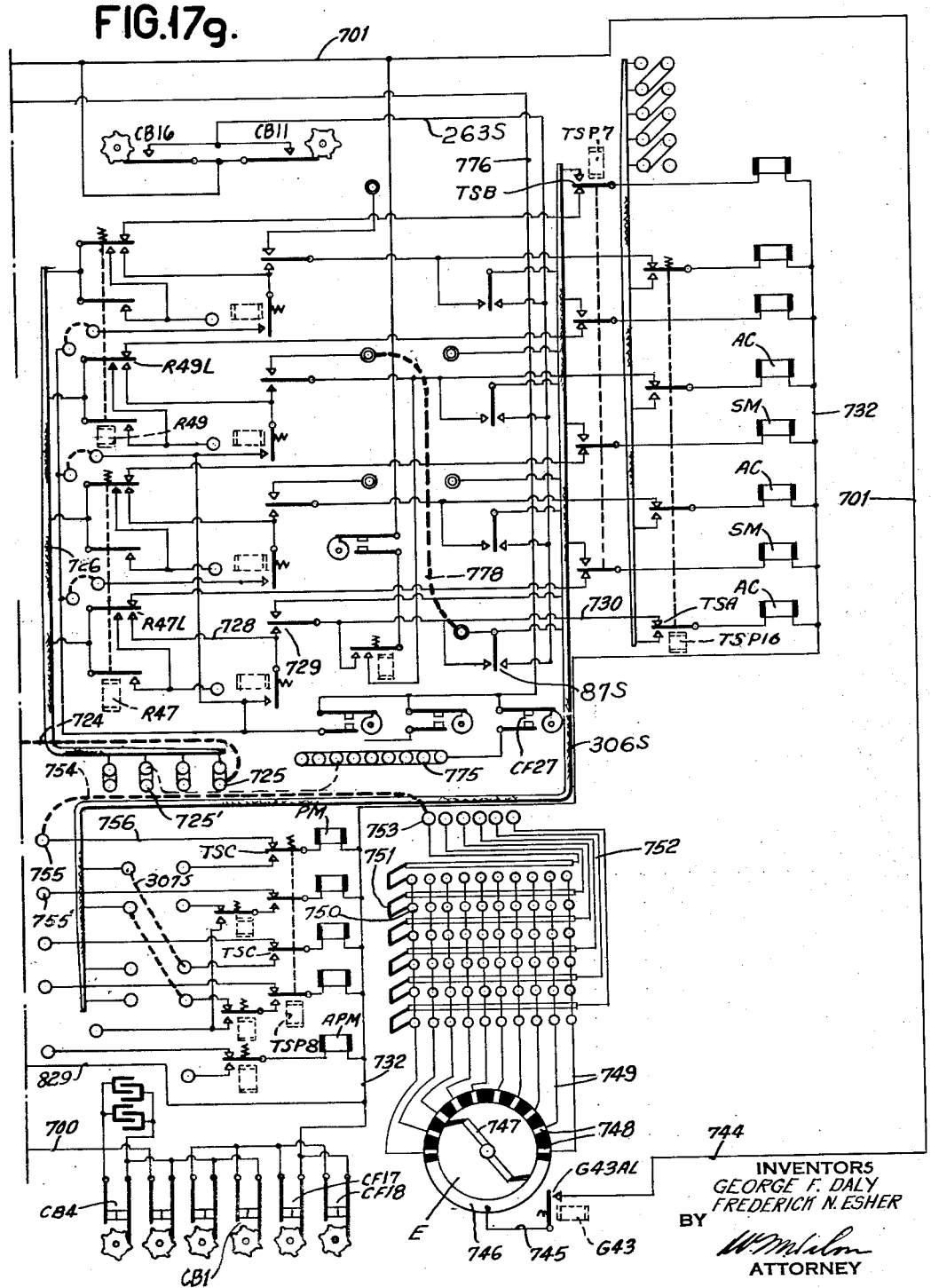

Feb. 13, 1945.　　　　G. F. DALY ET AL　　　　2,369,441
PAPER FEEDING DEVICE
Filed July 24, 1940　　　22 Sheets-Sheet 22

INVENTORS
GEORGE F. DALY
FREDERICK N. ESHER
BY
ATTORNEY.

Patented Feb. 13, 1945

2,369,441

UNITED STATES PATENT OFFICE 2,369,441

PAPER FEEDING DEVICE

George F. Daly, Endicott, N. Y., and Frederick N. Esher, Rutherford, N. J., assignors to International Business Machines Corporation, New York, N. Y., a corporation of New York Application July 24, 1940, Serial No. 347,248

8 Claims. (Cl. 235—61.7)

This invention relates to improvements in recording machines and more particularly to the record feeding devices thereof. The invention is concerned with printing duplicate records and feeding a carbon copy to a limited extent so that a condensed record of the original is provided.

Although condensed billing devices are known to exist for making compact copies of original records, the present improvement provides novel feeding controls for spacing and arranging duplicate printing to make it easy to segregate and identify portions of original recordings.

An object of the present invention is to provide dual feeding devices for shifting duplicate record copies with differential spacing. The two record feeding devices provided are coordinated so that the data on the carbon copy is arranged in a compact formation, yet separating data of different accounts, so that they are easily sighted for quick identification.

A further object of the invention resides in the provision of an original record such as a continuous strip of connected checks whereon a group of items of recorded data are spaced at a considerable distance from the items of other accounts, and another record such as a duplicate or register sheet which is divided into narrow blocks, each of which is allocated for the recording of one of the groups of items. The blocks are proportioned to receive a certain number of item lines related to the same account. Should the number of lines of one account be greater than the lines of a single block. there is an overflow into the second block and the feeding devices are arranged to carry the register sheet over the unused part of the second block to begin recording of the new account at the top of the third block.

A further object of the invention is the provision of record feeding devices for dividing the continuous duplicate or register sheet into predetermined form lengths made up of a predetermined number of blocks so that such sheets may be bound into booklets for ready reference and comparison with the items of the original record.

It is another object of the invention to provide means for controlling the recording of a progressive total near the bottom of each sheet of the register strip. It is arranged that this total recording normally will be placed in a predetermined block near the end of the sheet. However, when an overflow condition presents itself in the block above the total block. the recording of the total is suppressed and no total is printed until the appearance of the end of the following form.

Another object of the invention is the provision of feeding devices for moving a register sheet a differential distance to bring it from the last recorded line on one form to the first item line of the succeeding form. There are three different conditions which may prevail when the end of the register sheet approaches the printing position. When the lines of items of the last recorded account fall within the last item receiving block without an overflow, then the total is printed and the sheet is moved to present the first item line of the first block of the next form. Under other conditions, the number of items of the last account are greater than the allocated number of lines in the last block, and then the total is eliminated and feeding must take place from the last recorded line to the first item line on the following form. A third condition is presented when the next to last block is overflowed and items are recorded in the upper portion of the last block, relating to the account of the next to last block. Under such conditions, the additional line spacing controls are called into action for a feeding operation of greater duration and interrupted to permit printing of a progressive total in the usual position.

An object of the invention is the provision of a step switch or commutator device with associated controls made progressively effective as the last few blocks of a register sheet pass the printing position. The switch is stepped along in synchronism with the movement of the sheet by settable cam devices which also limit the feed skipping from block to block. One switch control initiates taking of a progressive total and prevention of check ejection until the total is printed on the check stub. Another switch control prevents stopping of skipping and maintains feeding to the end of a form. A final switch control initiates check ejection, card feed restarting and step switch restoration.

An object of the invention is the provision of means of differentiating record cards of different accounts and further distinguishing the dividend cards from the address cards of the same account, and joint control thereby over the total taking and sheet skipping devices. Different account number indicia appear on the separate groups of cards; and within each group, the name and address cards each bear a special indicium or X perforation which is not on dividend cards. The change from no X to X cards (i. e., from dividend to address cards) is detected and used to initiate a total taking operation, while the change from X to no X is sensed and used to stop tabulation and start skipping. The change in account number indicia should occur at the same time as the change from X to no X. If, instead, unrelated dividend cards are found together, a total taking cycle is taken at the time the change in account number is sensed and the check is ejected without an address. A mixture of unrelated dividend cards and address cards also results in a check without an address. When only the address cards of a group are of more than one account or group, the printed address is left incomplete and the check ejected. Thus, all errors in card arrangement are made evident in the incomplete appearance of the corresponding checks.

A further object of the invention is the provision of control by block counting devices for initiating operation of the line spacing mechanism for shifting a register sheet to and from a total recording position. Line space operation also depends upon completion of recording of all related items of one account, and the recording of a total after block counting determines the presence of a predetermined last block before line space skipping is initiated.

It is a further object of the invention to provide joint line counting and block counting control for recording a total and feeding a continuous sheet from form to form. When an overflow condition of the last block is sensed, recording of the total is suppressed. When the overflow condition of the next to the last block is sensed, a total is recorded but spacing must be augmented to carry the register sheet from one form to another.

Other objects of the invention will be pointed out in the following description and claims and illustrated in the accompanying drawings, which disclose, by way of example the principle of the invention and the best mode, which has been contemplated, of applying that principle.

In the drawings:

Fig. 2 shows an example of the original record or check strip printed under control of the record cards.

Fig. 3 shows sample portions of the duplicate or register sheet bearing printed data which are carbon copies of the data on the checks of Fig. 2, said register sheet being spaced differentially between block spaces to provide a more compact record than would an exact duplicate of the check strip.

Fig. 3a is a detail view of a portion of a punched card showing the code perforations for controlling alphabet printing.

Fig. 3b is a side elevation view of the mechanism for controlling the positioning of the alphabet printing bars.

Fig. 4 is a side elevation of the entire machine showing the paths taken by the two record sheets.

Fig. 4a is a side elevation view showing the paper guides and the mechanism for mounting and moving the guides.

Fig. 4b is a sectional elevation view taken along the lines 4b—4b in Fig. 4a.

Fig. 6 is an elevation view of the line space control mechanism.

Fig. 11 is a front elevation view showing the line space mechanisms associated with both platens.

Fig. 12 is a detail sectional elevation view taken along the line 12—12 of Fig. 11 and showing one of the swinging arms supporting the lower platen.

Fig. 15 is a plan view of a step switch of the kind used for line counting and block counting.

Fig. 16 is an end view of the counting switch shown in Fig. 15.

Figs. 17 to 17g, when taken together, form a wiring diagram of the tabulating machine, automatic carriage and special controls provided between the two.

Figure 18:
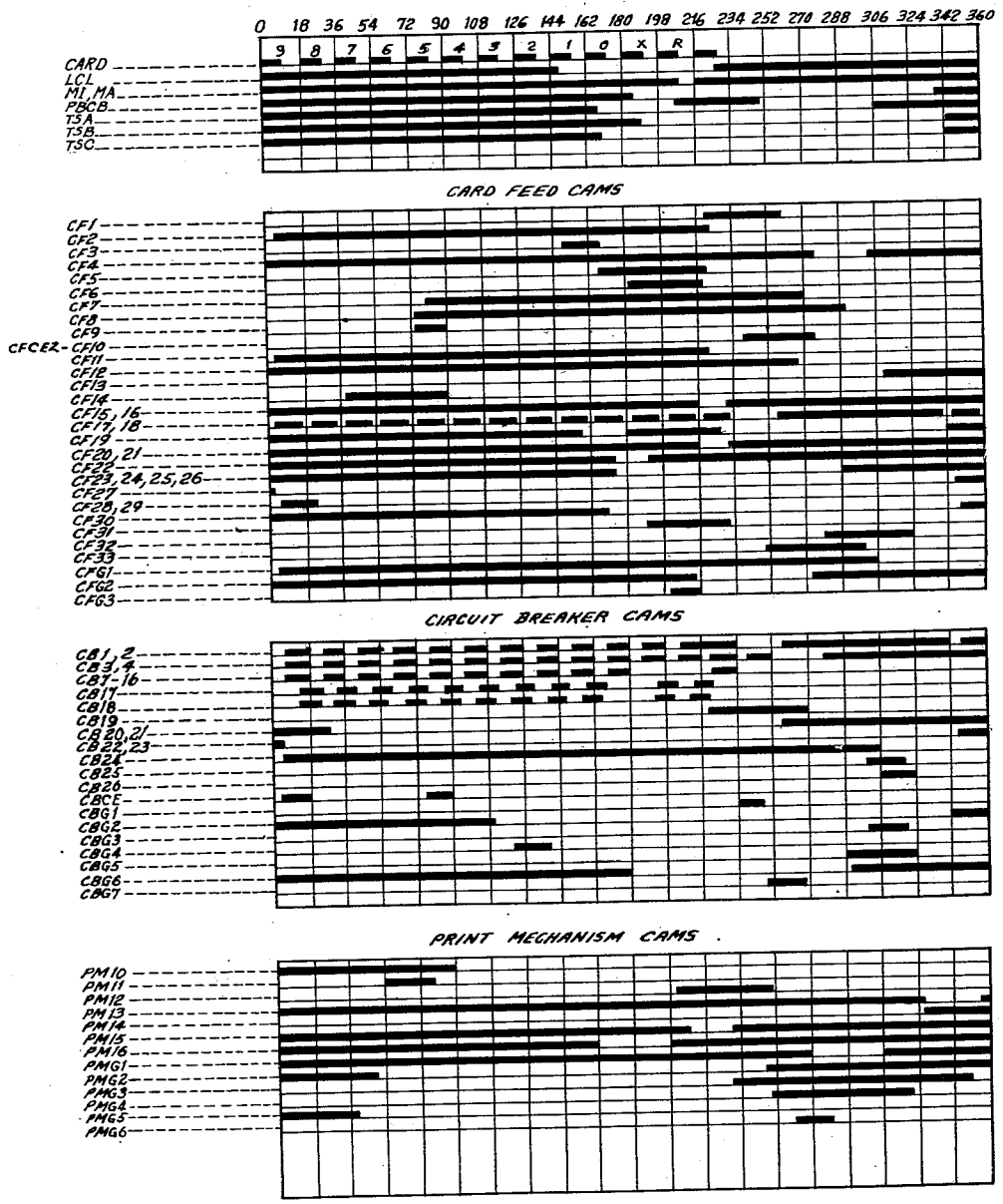

Fig. 18 is a timing chart of the electrical controls.

The composition of the machine

The machine includes a series of standard units in which special mechanisms are added and the controls connecting the various units are unique to provide the novel record feeding controls of the present invention. The general card sensing, accumulating and tabulating mechanism is of the form disclosed in the Mills Patent 2,079,418. This machine is provided with a set of alphabet printing controls adapting it for printing names and addresses according to the disclosure of Patent 2,111,122 to Mills et al. Certain of the accumulating devices present in the machine are provided with top counter readout devices for reading out check numbers stored in an accumulator in the manner set forth in the Mills Patent 2,111,120. Special X perforation controls are provided which are somewhat the same as those in the disclosure of Lake et al. 1,976,617, wherein the X and no X control of an accumulator is set forth in detail.

Some of the sheet feeding mechanisms are found disclosed and described in detail in the Carroll Patents 2,066,029 and 2,189,025 which reveal an automatic carriage structure adapted to cooperate with tabulating mechanism.

The Control Cards

Figure 1:
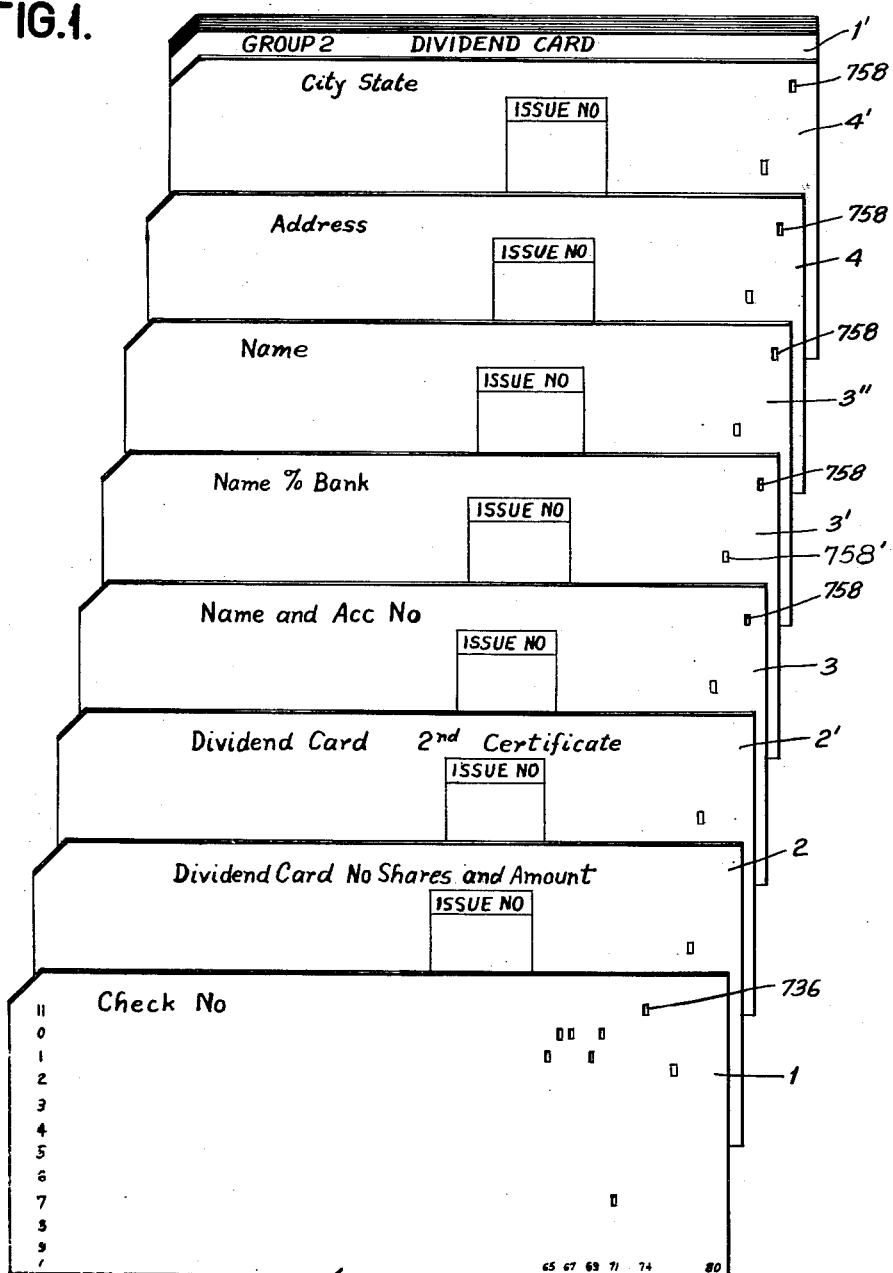
Fig. 1 shows a series of perforated record cards related to the first account of an issue of stock.

Referring to Fig. 1, it is seen that the entire set of account cards is headed by a check number card 1, which bears perforations representing the serial number to be placed on the first check. This first number leads the series of serial numbers recorded successively on the check strip. The first card also contains a special perforation 736 which controls the initiation of a totaling cycle, so that a group indicating cycle follows directly thereafter to record the first check number on the top of the first check, as explained more fully hereinafter with reference to the wiring diagram.

Passing down along the line of cards, it is seen that the two cards following the check number card, are dividend cards 2 and 2'. The number of such cards related to each account will vary according to the number of certificates held by the particular stockholder. In this first example there are two certificates involved, each representing a certain number of shares of stock and a corresponding dividend amount. The share numbers and amounts on the dividend cards are accumulated and printed together as totals on the check and check stub. Following the dividend cards are a series of name cards, 3, 3' and 3". These cards are provided for the purpose of name and account number representation and may vary in number according to the length of name, or according to a trustee relationship between the owner of the stock and the bank to which the dividend is to be addressed. Each card represents a line of name data which may be the abbreviations of one or more names. These name cards and the following address cards 4 and 4' all bear special perforations 158 for controlling group control devices to initiate a total taking cycle after the appearance of the last dividend card and also to initiate printing of the total amount of the check, and control the machine for operation in listing as distinguished from tabulating.

This same special perforation 158, when encountered on the last address card 4', and also distinguished from the first dividend card 1' of the second group, controls the initiation of spacing and ejection of the first check and positioning of the second check ready to receive the second serial number before the accumulation of the second dividend amount.

It may be noted that all the cards, after the first, bear issue number perforations which are sensed for a group change exercising major group control for printing a final total after analysis of all the cards relating to one issue of stock. The cards also bear account number perforations 158' which are the same for related dividend, name and address cards of a group, but differ for each different group of cards of different accounts.

The Record Media

In Fig. 2 is shown a sample of the check strip 5 divided by lines of weakness into a large check section at the left and a smaller stub section 6 at the right. The check forms are preprinted with the usual identification data, signature and date. The first impression on each check is the serial number which appears directly under the designation "Check No." This number is duplicated to appear on the stub as well as on the check. The next line of printing impressions represent a total dividend amount and the total number of shares. The share number appears only on the stub while the amount is found on both the check and the stub. The third line printed on the check strip 5 comprises a name and the account number, the former appearing on the check only while the latter appears as the last line on the stub. Following the first name line are a series of impressions representing other name and address data recorded on the check.

In Fig. 3 is shown a portion of the register sheet 7 which is slightly wider than the check strip 5 and placed directly thereunder with a carbon sheet between the two, so that all the data recorded on the check and stub is duplicated on the register sheet. The carbon sheet is similar to the check strip in width and arrangement of marginal holes. It is not shown separately but assumed to be part of the check strip, as it follows under the strip in the same path of travel under control of the same feeding devices. It is noted that the register sheet, in addition to having a preprinted heading data and vertical dividing lines, is divided into sections or blocks numbered from 1 to 22. Each of these blocks is proportioned to receive six lines of numerical and alphabetic data which is sufficient to provide room for most check identifications. However, when any check bears more than six lines of identification and numerical data, there is an overflow of the duplicate impressions into a second block on the register sheet and the space of the two blocks is reserved for the data of one check. The blocks are numbered from 1 to 22, the first twenty blocks being designed to receive check identifications while the twenty-first block is usually reserved for a progressive total such as the one shown near the top of Fig. 3. Between the twenty-first and twenty-second blocks is a line for severing the sheet sections before binding. The twenty-second block is reserved for preprinted heading data.

Both forms of records are seen to be made with marginal perforations which adapt them to be fed in a positive manner by pin feeding devices such as those shown in U. S. Patent 2,000,650. Of course, other positive feeding means may be used or a frictional drive be employed using plain feed rolls.

The check and account numbers and dividend amount are grouped and aligned compactly at the right of the check strip and register sheet. A common vertical space or order marker is provided at the left of the hundreds orders of the numbers and at the decimal place of the dividend amount. The extra 0 at the right of the amount can be disregarded as it is blocked off on the stub.

The numbers at the bottom of the register sheet (Fig. 3) and at the left of block 4 are grand totals of the dividend amounts and numbers of shares.

The illustrative machine

The invention is illustrated in connection with a problem in corporate trust accounting. The type of report which is to be prepared by the machine is a dual record consisting of dividend checks and a register sheet or duplicate copy of such checks. It is desirable when preparing a stockholder's dividend check to provide an identical record of the check showing the name, address, number of shares, amount, etc. The present invention provides means for preparing a complete dividend check including such pertinent data as a serial check number, number of shares, name, address, and amount of check. One such check is prepared for each stockholder's account irrespective of the number of individual stock certificates held by the stockholder. The carbon copy register sheet is printed concurrently with the check and by the same type impressions, so that there is no question about the duplication of the check. Line spacing devices are provided for feeding the dividend checks and the register strip line by line concurrently when recording the related lines of data of one account, and then after the line spacing controls cooperating with the register sheet function to move the sheet to another block position to start the recording of another check, the check strip is ejected by long feeding mechanism other than the line spacing devices.

The two kinds of feeding means are independently controlled for moving the check and register strips, because it is desirable to arrange the register sheet as a more compact type of record.

It may be explained that one or more name and address cards are provided for each group of stockholder's cards, that is, for each account. Each of these name and address cards is perforated to represent a name, a part of a name or one line of an address. These cards are also perforated with the stockholder's account number. The stockholder's file includes a card for each certificate representing a number of shares of stock. The file of tabulating cards comprising certificate cards and name and address cards is the permanent and original record of the stockholder's holdings for the entire corporation, and this file may be used at any time for the preparation of notices, proxies, or dividend checks. In the printing of checks and proxy notices, it is desirable to prepare the duplicate register strip of the present invention.

A means is provided for printing a serial number on each check. The number chosen to start the serial numbering is perforated in a special punched card which is fed into the machine in advance of all the name, address and dividend cards of the entire issue. This number is entered into an accumulator which is thereafter advanced one digit upon the printing of each check. The check numbers are then read from the readout device of the accumulator and printed on each check before the other data is recorded thereon. The machine is arranged to list the names and addresses at normal listing speed and then tabulate the number of shares and amounts at higher speeds. Controls are provided to initiate a listing operation as the first card of each stockholder's group passes the lower brushes of the machine, although no amounts are directly listed from such a card, this listing cycle being provided for recording the check number. The machine will then shift automatically to the tabulating speed and continue such operation as long as certificate cards bearing the same account number continue to pass under the lower brushes of the machine and until a name or address card has passed through the upper brushes. The first name card bears the special designation which operates controls to change the machine from tabulating to listing operation. Prior to the listing of the name and address, it is necessary for the machine to enter upon a total taking and reset cycle during which time the number of shares and amount of the check is printed on the face of the check. Attached to each check is a stub which may be used by an accountant as a comparison means to identify outstanding checks. It is upon this stub that the number of shares is printed on the same line as the amount of the check during a total printing cycle. An account number is printed on the stub without being duplicated on the face of the check, since the name and address provides identification for the check.

Following the printing of the check amount, the machine enters upon one or more listing operations and continues to list until the name and address of the stockholder has been recorded on the check. The total number of lines printed on each check will normally be six or less. Regularly graduated blocks of space are provided on the register sheet for a maximum of six lines of printing per block. The first line always bears the check number, the second line the amount and number of shares, the third line represents the first line of name and address, etc. Accordingly, a four line name and address may be accommodated in each single block space provided on the register sheet. Variable spacing devices are provided in the machine for advancing the register sheet to the first line printing position of a new block. Whenever the recording of a check has been completed, it will be noted that if the total number of lines for the check is greater than six, one or more lines of the address will be printed on the next following block space of the register sheet. Under such circumstances the machine is arranged to space the register sheet automatically to the beginning of the third block when the name and address printing of the first check has been completed.

In the example shown, each check form is 3½ inches in height and only 1 inch block spaces are provided for recording the related data of each check on the register sheet. The register sheet is sub-divided by lines of tearing perforations into lengths bearing a plurality of block spaces. As shown, space is provided for making twenty ordinary check registrations per register sheet, a sheet in this case being 22 inches in length. The extra space is utilized in part for heading and binding space at the top of the sheet, and the remainder of the excess 2 inches is utilized to provide a line for printing a sheet total or so-called progressive total.

*The paths of motion of the record strips*

In Fig. 4 is shown in a general way, the arrangement of the tabulating machine T, the automatic carriage C, a pair of platens or feed rolls 10 and 51, and the manner in which the record strips are brought up to and around the feed rolls. Above the tabulator T is the paper feed carriage provided with the usual platen 10 and an extra platen 51 which in the present instance, is used merely as a feed roll. Cooperating with both platens is an automatic carriage unit C such as that disclosed in Carroll Patents 2,066,029 and 2,189,025. Mounted behind the tabulator is a frame 8 providing shelves for a series of boxes 11, 12, 13 and 14 holding the record strips in fan-folded formations. From the lowest box 11, the check strip 5 is carried upward over a sheet guide 9 and around the outside of a curved guard 15 concentric with the lower part of platen 10. This guard 15 (Fig. 4c) is provided to prevent a snubbing action between the check strip and a register strip which passes around the lower platen above the guard 15. Continuing along the path followed by check strip 5 as it passes above the guard 15 in Fig. 4, it is seen to pass around the top of the upper feed roll 51 and it then passes over a removable paper table 16 and a stationary table 17 before falling in a fan-folded formation into the receiving box 14 located near the top of frame 8. The removable table is assembled on the frame 8 by means of a series of studs 18 passing through bayonet slots formed in the stationary table 17. At the lower end of table 16 are provided a pair of latches 19 engaging studs on the carriage side frames to hold the table in position for guiding the check strip.

The register sheet 7 follows a different path when it is lifted out of the lower box 12 and drawn upward over the guide 29 and then around the lower platen 10 above the guard 15. After passing upward around the lower platen, the register sheet is drawn across another guide 20 and over a fixed table 21 before being allowed to fall in a fan-folded formation into the receiving box 12.

The printing devices

Before presenting a detailed description of the sheet guiding device, it may be well to point out and explain the manner of printing in connection with the printing devices shown diagrammatically in Fig. 4. There it is seen that a type bar 22 is positioned for vertical movement past the platen 19 and designed to present one of the various type carrying members in alignment with the printing hammer 23. The printing position assumed by the type bar 22 is determined by the time of operation of a print magnet PM, the armature of which is connected by a call wire 24 to a latch 25 for releasing a pawl 26 designed to engage one of the series of notches 27 cut in the side of the type bar 22. The type bar is raised in synchronism with the movement of the record card under analyzing brushes, and it is according to the displacement of the perforation in the card that the timing of print magnet PM is governed to stop the bar in the position to print a character representing the perforation sensed. In a similar manner the bar is stopped to record the digits of a total, read out by an impulse emitter moving in synchronism with the type bars.

The name and address cards 3, 3', 3'', 4 and 4' (Figs. 1 and 3a) bear alphabet indicia in the form of code perforations. These perforations are sensed by the lower brushes and directed to print control magnets to control printing of names and addresses.

The arrangement of the perforations in the record card will first be explained. Referring to Fig. 3a, the diagrammatic record card 30 has the usual perforations for indicating numerical values as shown in the left end of the card. The alphabetical characters from A to I are combinations of one of the numerical characters from 9 to 1, plus a perforation in the R index point position. The characters J to R each comprises a perforation in one of the numerical positions 9 to 1, plus a perforation in the X index point position. The remaining letters of the alphabet, namely, S to Z, each comprises a combination including one of the perforations 9 to 2, plus a perforation in the zero index point position.

Referring to the wiring diagram, it may be mentioned that, as the address cards pass under the lower brushes LB (Fig. 17f), and differentially timed impulses are initiated, these impulses are carried by plug wires leading from brush plug sockets to sockets in series with control magnets APM, an example of which is shown in Fig. 17g, and used to position alphabet print bars as about to be explained with reference to mechanism similar to that shown in Patent 2,111,122.

In Fig. 3b is shown an alphabet type bar 22A which is provided with a plurality of type elements upon which the digit and alphabetic characters are arranged as indicated. For the purposes of explanation, the various characters are arranged and labeled in accordance with a particular zone. Thus, the digits are included in zone 1; the letters Z to S in zone 2; J to R in zone 3; and A to I in zone 4. Reference to Fig. 3a will show that the letters I, R and Z each contains a perforation in the 9 index point position, but has a different zone perforation R, X and O. Similarly, the letters H, Q and Y each contains the perforation 8 and a different zone perforation.

The type bar 22A is arranged to be moved to pass the printing position opposite platen 51 in synchronism with the movement of the card by the brushes LB and, as the 9 index point positions traverse the brushes, the Z type element will be approaching the printing position; as the 8 index point positions traverse the brushes, the Y type element will be approaching the printing position, and so on.

Each type bar 22A is provided with a series of teeth 117 which are labeled 9 to 0 and which represent corresponding index point positions on the record card. As the type bar is moved upwardly, the teeth 117 move to pass a stopping element 118. The element 118 is pivoted at 125 to a bell crank 126 which is normally held in the position shown by a bell crank latch 127 which has connection through a link 128 to the pivoted armature 129 of magnet APM.

Upon the energization of magnet APM in response to the sensing of a digit perforation, armature 129 will be rocked clockwise, drawing downwardly on link 128 to cause clockwise rocking of latch 127 to release bell crank 126 whose spring will thereupon shift the stopping element 118 toward the right into the path of the tooth 117 corresponding to the perforation whose sensing caused energization of the magnet. Further upward movement of the type bar is thus interrupted at this time. The stopping element 118 is held against upward movement by a bail 130 which later, as the zone holes are sensed, rocks counterclockwise to permit resumption of the upward movement of the type bar. During such movement, the element 118 may be stopped by a lever 131 which loosely straddles a rod and has its upper curved edge held down by a bar. The left end of the lever has an extension 132 resting upon a bail 133 which occupies a raised position during the analysis of the digit representing positions of the card. The member 131 is provided with three teeth which, under control of the bail 133, move downwardly to pass the toe of a stopping pawl 139 during the time that the zone perforations O, X and R pass the brush LB. The pawl 139 is normally held with its toe out of the path of the teeth by a bell crank latch 140 which has a link connection 146 with the lower armature 147 of magnet APM.

Extending across the latches 140 is a bail 148 which occupies a raised position during the sensing of the digit positions, preventing tripping of these latches during this portion of the sensing operation. While the zone perforations are passing the brushes, however, the bail 148 is rocked slightly counterclockwise so that energization of magnet APM, due to the sensing of a zone perforation, will rock its armature 147 clockwise to elevate link 146 and rock bell crank 140 counterclockwise to release pawl 139 which will engage the first tooth O if the zone hole is zero; the second tooth X, if it is in the X index position; or the third tooth R if it is in an R hole. If no zone hole is present, the lever 131 will rock an additional step to cause an upper shoulder to engage the pawl 139. From the foregoing it is apparent that the alphabet printing bars can be stopped as governed by the address code perforations on the name and address cards, so that various words are spelled and recorded at the printing line.

Platen and sheet guide supports

Figure 5:
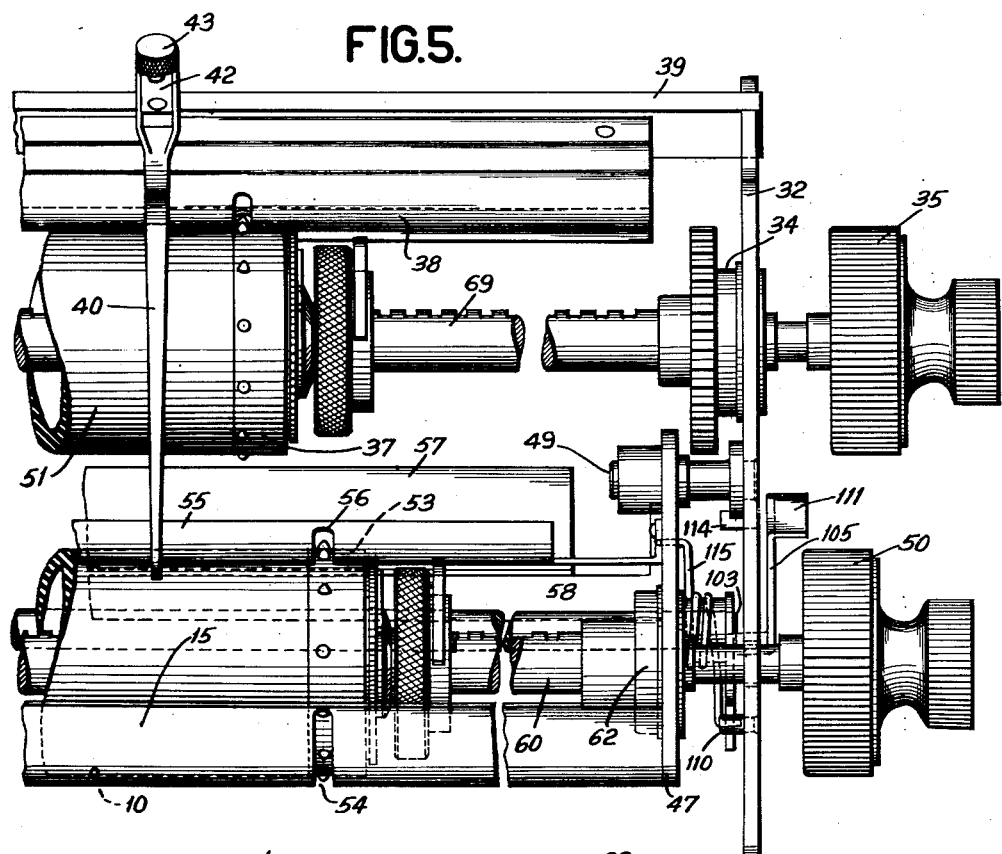
Fig. 5 is an elevation view of the right hand end of the pair of platens or feed rolls.

The platens and sheet guides are supported between a pair of main carriage side frames 31 and 32 (Figs. 4a, 4b, 5 and 11). Figs. 11 and 5, when placed side by side, show the mechanisms associated with the left and right ends, respectively, of the carriage supporting structure. The upper feed roller 51 is mounted on a shaft 69 which passes through bearings 33 (Fig. 11) and 34 (Fig. 5). Extending from the right end of the shaft is a knob 35 which may be manipulated to turn the platen. Both ends of platen 51 are provided with pin feeding devices 36 and 37 of the kind shown in Patent 2,000,650. Directly above the upper platen is a slotted retaining strip 38 (Figs. 4a and 5) which extends across the machine to hold the check strip down into engagement with the feeding pins which pass through the slots cut in the retaining strip. Retainer 38 (Fig. 4a) is secured to a rectangular bar 39 (Fig. 4a) which is assembled on the carriage frame by being inserted in open ended rectangular notches cut in the top of the frames 31 and 32. Also carried by the bar 39 are a series of pointers 40 arranged vertically in front of the check strip 5 as it passes from the lower platen to the upper platen. These pointers 40 are pivoted at 41 on L-shaped members 42 that are removably held on bar 39 by means of a screw 43, and the pointers may be moved along a bar and secured wherever desired to hold the check strip taut around the guard 15 and opposite the periphery of the lower platen 10 at the printing line.

As the check strip 5 leaves the upper platen 51, it is pushed along the table 16 previously mentioned. Secured to the sides of table 16 are hinges 44 attached to elongated bars 45 for holding the strip down on table 16. Lower platen 10 is suspended in bearings 61 and 62 on a pair of swinging plates 46 (Fig. 11) and 47 (Fig. 5) fulcrumed on shaft 48 and stud 49 extending from the main side frames 31 and 32, respectively. The lower platen is fastened to a shaft 60 which passes through the swinging frames 46 and 47 and extends also beyond the right main side frame 32 (Fig. 5) at which end is mounted a knob 50 for operation by hand to adjust the position of the lower platen. The ends of lower platen 10 are provided with pin feeding devices 52 and 53 similar to the devices 36 and 37 mentioned with reference to the upper platen. It will be noted from reference to the showing in Figs. 11 and 5 that the lower platen is longer than the upper one, so that the check strip 5 may pass around the lower platen in advancing toward the feeding pins on the upper platen without interference by the feeding pins on the lower platen. The guard 15, previously mentioned, is slotted as at 54 to coincide with the position of the projecting pins on the lower platen, and it extends beyond both sides of the lower platen and is secured to the bottom edges of the swinging frames 46 and 47. Also attached to frames 46 and 47 is a curved retaining strip 55, curved to fit around a portion of the periphery of the lower platen 10 and positioned close enough to it, to hold the register sheet 7 down on the platen and into engagement with the feeding pins which project through slots, such as 56 (Fig. 5) cut near both sides of the retaining member. Also attached to the swinging frames 46 and 47 is a curved guide 57 which acts to direct the register sheet 7 upward, so that it may continue to be conveyed along the paper table or guide 20. Guide 57 (Fig. 12) is attached to a block 58 secured to the swinging frames.

The three sheet guides 9, 20 and 29 (Fig. 4a) are all formed in the same general fashion, with adjustable mountings whereby they may be shifted horizontally, so that the end members carrying the vertical flanges may be positioned to confine a record strip of any particular width. Attached to the bottom of each of the lower guides 9 is a bracket 63 (Fig. 4a) which is perforated to encircle a pair of shafts 70 and 71 which are secured between the main side frames 31 and 32.

The upper sheet guide 20 is also provided with a bracket 72 encircling shafts 73 and 74. And the middle guide 29 also has attached thereto a bracket 75 mounted on shafts 76 and 77. However, the mounting of the two last mentioned guides differs from the mounting of the lowest guide 9, in that the lowest guide, is mounted on fixed shafts while the other guides shift with the other shafts 73, 74, 76 and 77 which are fixed to a shiftable frame 78, the operation of which is about to be described.

Platen swinging and guide retracting devices

The lower platen 10 and the two upper sheet guides 20 and 29 are movably mounted in order to facilitate the threading of the two record strips around the lower platen. The lower platen is arranged to be swung toward the rear and locked in such a position, and the upper sheet guides are also designed to be moved in the same direction and held in a retracted position while the record forms are drawn around the platens and behind the type members which are so positioned that they normally allow very little room between the outer periphery of the lower platen and the faces of the type.

Figure 4B:
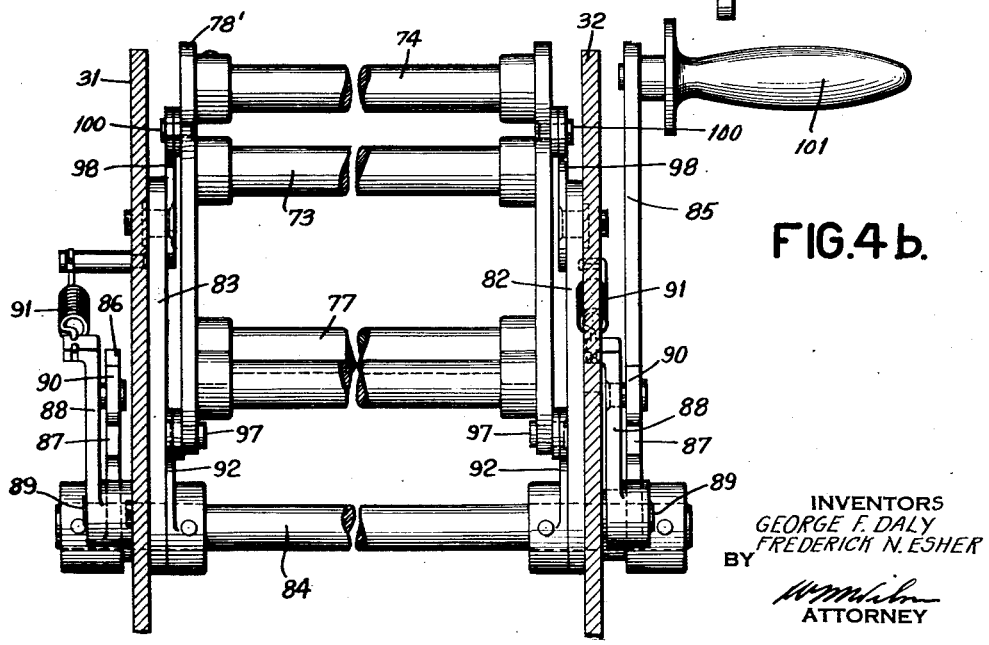

Fastened to the rear of side frames 31 and 32 (Figs. 4a and 4b) are a pair of extension plates 82 and 83 which are fitted with bearings carrying a shaft 84 at the lower end. Attached to shaft 84 is a main adjustment lever 85, at the right side of the machine (Fig. 4b), and at the left side there is attached an auxiliary adjustment lever 86, both of said levers being formed with a pair of notches 87 (Fig. 4a). Cooperating with the notch formation of levers 85 and 86 are a pair of position retaining frames 88, one on each side of the machine, said levers being pivoted on studs 89 and provided with rollers 90 which are drawn into cooperation with notches 87 by coil springs 91. Also attached to shaft 84 are a pair of suspension arms 92 pivotally connected to the frames by means of studs 97 extending through the lower part of the guide shifting frames 78 and 78'. Connected in a similar fashion are another pair of suspension arms 98 fulcrumed at 99 on the extension plates 82 and 83 and pivotally connected at 100 to the movable guide frames 78 and 78'. The parts 83, 92, 98 and 78 form a parallelogram with fixed centers 84 and 99 and movable connections 97 and 100 for carrying the two upper guides 20 and 29 in an upward and retracted direction whenever adjustment lever 5 is operated by the handle 101 thereon in a clockwise direction (Fig. 4a) to swing the parts so that roller 90 engages the notch 87 shown disengaged in Fig. 4a.

At the time that the two guides are raised by manipulation of lever 85, the top table 16 has been removed so there is plenty of room for the guides to move upward and spread out in the path of the record strips, so that they may be easily grasped and wrapped around a lower platen. The removal of the upper table 16 is accomplished by manipulating the latch member 19 pivoted on studs 80 projecting from brackets 80' secured to the under side of table 16. The latches 19 cooperate with a portion of bracket 80' to engage a shaft 79 and act as a holding means for the front part of table 16. Springs 81 tend to hold the latches 19 in engagement until the upper part of the latch is grasped and rocked in a counter-clockwise direction for disengaging and removing table 16.

As mentioned hereinbefore, it is necessary to move the lower platen toward the rear when threading the record strips, in order that sufficient space be provided between the platen and the typebars. This is accomplished by swinging the lower platen 10 on the pivots 48 (Fig. 11) and 49 (Fig. 5) which are the fulcrums for the left and right swinging frames 46 and 47. Reference to Fig. 4a shows that the right side frame 32 is perforated with an arcuate slot 102 formed concentric with center 49 and through which projects the lower platen shaft 60. Running through the rear portion of the swinging side plates 46 and 47 is a shaft 103 (Figs. 4a and 12) upon which is secured a pair of latches 104 and 105. Latch 104 normally engages a pin 106 extending from the inside of the left main frame 31 (Fig. 11) and latch 105 (Fig. 4a) normally engages a pin 110 extending inwardly from the inside of the right side frame 32 (Fig. 5). The connections mentioned, serve to hold the lower platen 10 normally in the usual print receiving position. However, when it is desired to thread a new set of records around the lower platen, the platen is shifted by grasping and rocking the finger piece 111 (Fig. 4a) extending through slot 102 and outside the right side frame 32 (Fig. 5). Depression of finger piece 111 serves to rock the connected shaft 103 (Fig. 4a) in a counterclockwise direction to disengage latches 104 and 105 from the holding pins 106 and 110. Then, if the knob 50 (Fig. 5) is pushed toward the rear at the same time that finger piece 111 is held down, the platen is shifted rearward to a position wherein a second latching hook 113 (Fig. 4a), also formed on latch 105, engages another pin 114 extending inside the right side frame 32. The latching connection mentioned, serves to hold the lower platen 10 and the connected guard 15 in a shifted position, while the record sheets are being assembled in the machine. A wire coil spring 115 is wrapped around shaft 103 (Fig. 4a) and presses against the side of latch 105 to hold it into latching engagement with either of the latching pins 110 or 114. The other latching arm 104 (Fig. 12) is also urged by a spring 116 to assume a latching position. Whenever the machine is ready for printing operation, extension 111 (Fig. 4a) may be depressed to release latch 105 from pin 114 and the platen is free to swing downward until the latch associated therewith comes into latching engagement with pin 110.

*The automatic carriage drive*

A bracket 141 (Fig. 9) projecting from the carriage frame 134, forms a bearing for the shaft 142 of the carriage motor CM. A pinion 143 on the motor shaft 142 meshes with a gear 144 pivoted on a stud 145 on the side of bracket 141. Attached to gear 144 is a smaller gear 135 in mesh with a gear 136 keyed on the shaft 137. On the side of gear 136 (Fig. 10) is secured to a gear 93 in mesh with an idler gear 94. The driving train of connections continues through gear 94 meshing with another idler gear 95 which in turn drives a gear 96 fastened to the line spacing drive shaft 151. The gear connections just traced form a constantly running train from motor shaft 142 to line spacing drive shaft 151. Other gearing, also under the cover 133 (Fig. 10) with the line space drive, forms a selective two speed drive for the ejection mechanism described hereinafter.

*Line spacing mechanism*

Continuing the tracing of the line space drive, reference to Fig. 6 shows that shaft 151 carries a clutch plate 152 attached thereto. Adjacent the toothed plate 152 is a cam 154 loosely pivoted on shaft 151. This cam carries a clutching pawl 155 pivoted at 156. A compression spring 158 mounted in a stud on cam 154 tends to engage pawl 155 with clutch plate 152, but an extending tail on the pawl is normally obstructed by the end of an armature lever 160 connected to the armature 161 of the line spacing magnet LSM. The lever 160 is pivoted on a stud 162 and is urged in a counter-clockwise direction against stop pin 163 by a spring 164.

When the line spacing magnet LSM is energized, the armature lever 160 is rocked in a clockwise direction, releasing the clutch pawl 155 which then engages the clutch plate 152, thus connecting the cam 154 to the driving shaft 151. As the cam 154 rotates, it operates a lever 168 through a roller 169 on the lever in cooperation with the periphery of the cam. The lever 168 is pivoted on a stud 170 and is provided with an extending arm which is cut to form three notches. A link 172, placed adjacent the lever 168, carries a pin 173 adapted to cooperate with any one of the three notches in lever 168. The other end of link 172 is pivotally connected at 174 to a line spacing plate 175 loosely mounted on the platen feed and line space shaft 176. The plate 175 carries a feed pawl 177 pivoted at 178 on the plate and adapted to cooperate with a ratchet gear 179 fixed to shaft 176. This shaft is secured to gear 107 (Fig. 11) and thereby is adapted to turn the platen 51 through gears 108 and 109 and shaft 69.

From the connections mentioned, it may be noted that as the cam 154 (Fig. 6) is rotated, the lever 168 is rocked in a clockwise direction, pushing link 172 down and rocking the plate 175 so that pawl 177 advances the platen feed shaft 176 one or more steps in a counter-clockwise direction.

The amount of motion imparted to the platen feed shaft is determined by the adjustment of the end of link 172 so that pin 173 cooperates with any one of the three notches in lever 168. If the pin cooperates with the notch nearest the pivot of the lever, the motion imparted will amount to one line space. When the link is lifted to cooperate with the center notch the motion carried to the platen amounts to two line spaces. Swinging the link to the right and the highest position, causes cooperation with the end notch in lever 168 and connects the line spacing devices to produce three steps of feed.

The manual adjustment of link 172 is brought about by means of a manipulated arm 180 (Fig. 10) extending from the side of the carriage frame 134. The arm 180 carries a knob 181 with a plunger which the operator may set to hold the arm in any one of the three positions identified on the side of the frame. A shaft 182 (Fig. 6) is connected to the arm 180 and has secured thereon another arm 183 with a tab 184 cooperating with the side of link 172. By means of these connections, the link 172 is swung to a space selecting position by arm 180. A spring 186 urges the lever 168 in a counter-clockwise direction and tends to hold roller 169 against cam 154. Link 172 is held in constant cooperation with tab 184 by means of a spring 64.

A spring 187 wound around stud 178 tends to move pawl 177 into cooperation with ratchet 179. However, in the normal position of the parts, a cam face on the lower portion of pawl 177 cooperates with a stud 188 projecting from the frame 134 in such manner that the pawl is forced away from the ratchet. The same stud 188 serves as a stop for the plate 175 when it is drawn to the home position by a spring 189.

Secured to the side of ratchet 179 is a star wheel 190 provided for the purpose of normally preventing backward movement of the platen drive shaft 176. Cooperating with the star wheel 190 is a pawl 191 loosely pivoted on shaft 192 and held into cooperation with the star wheel by spring 193.

Ejection mechanism

In addition to the above described line spacing connections to the platen drive shaft 176, other devices are provided to feed or eject the check record paper for wide spacing. Many of the gears previously mentioned, namely; gears 144, 135, 136, 93, 94, 95, and 96 (Figs. 9 and 10) are used in ejecting as well as in line spacing. Attached to gear 96 (Fig. 10) is a gear 65 meshing with a gear 66 keyed to a shaft 67. This shaft 67 is similar to the other shaft 137 (Fig. 9) in that it may be moved axially to place a pinion 87 thereon in and out of mesh with an eject drive gear 68. The other shaft 137 terminates in a similar pinion 88. Shaft 137 operates at a higher rate of speed than shaft 67, because the former is geared almost directly to drive pinion 143 while the latter is driven through a train of gearing involving two speed reductions between gears 93, 94, and 65, 66. The machine operator may choose the speed of record ejection according to the distance or space to be ejected. For spaces less than 3½ inches it is advisable to use the high speed train of ejection gearing, while for all longer lengths the low speed train should be used. A detailed showing of the change speed gearing is disclosed in Carroll Patent 2,189,025.

Figure 9:
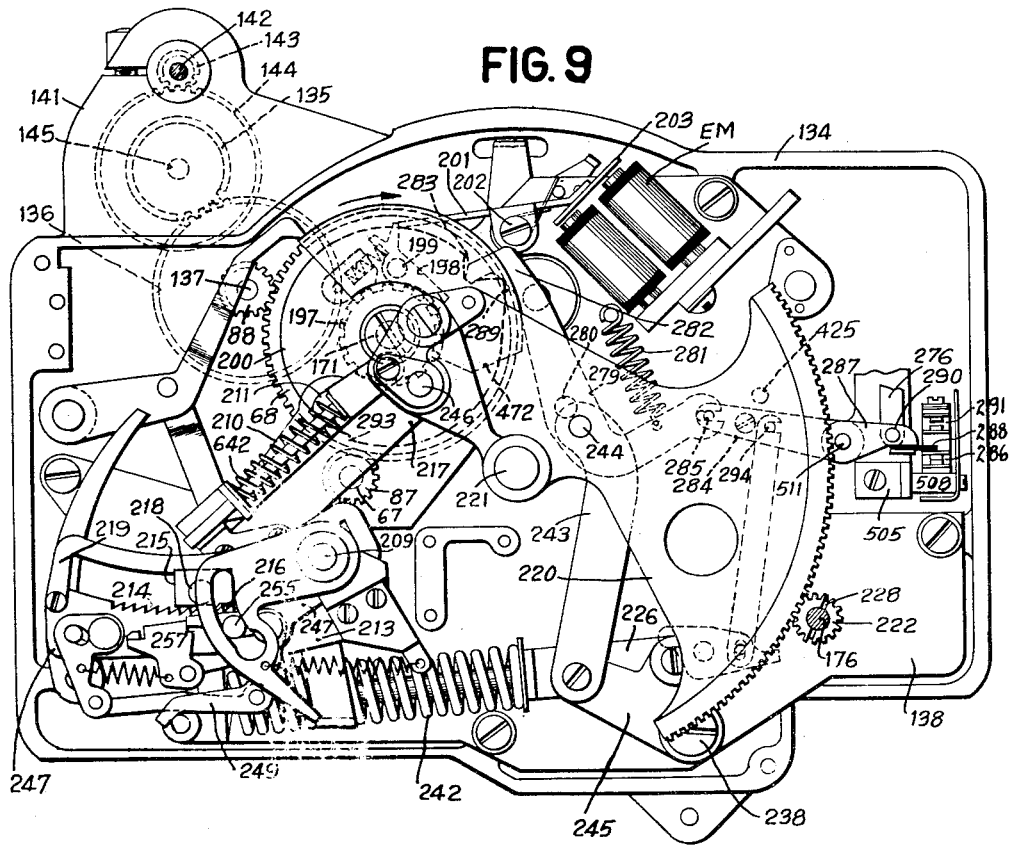
Fig. 9 is an elevation view of the mechanism for controlling ejection for moving the check strip with a long feeding operation from check to check.
Figure 10:
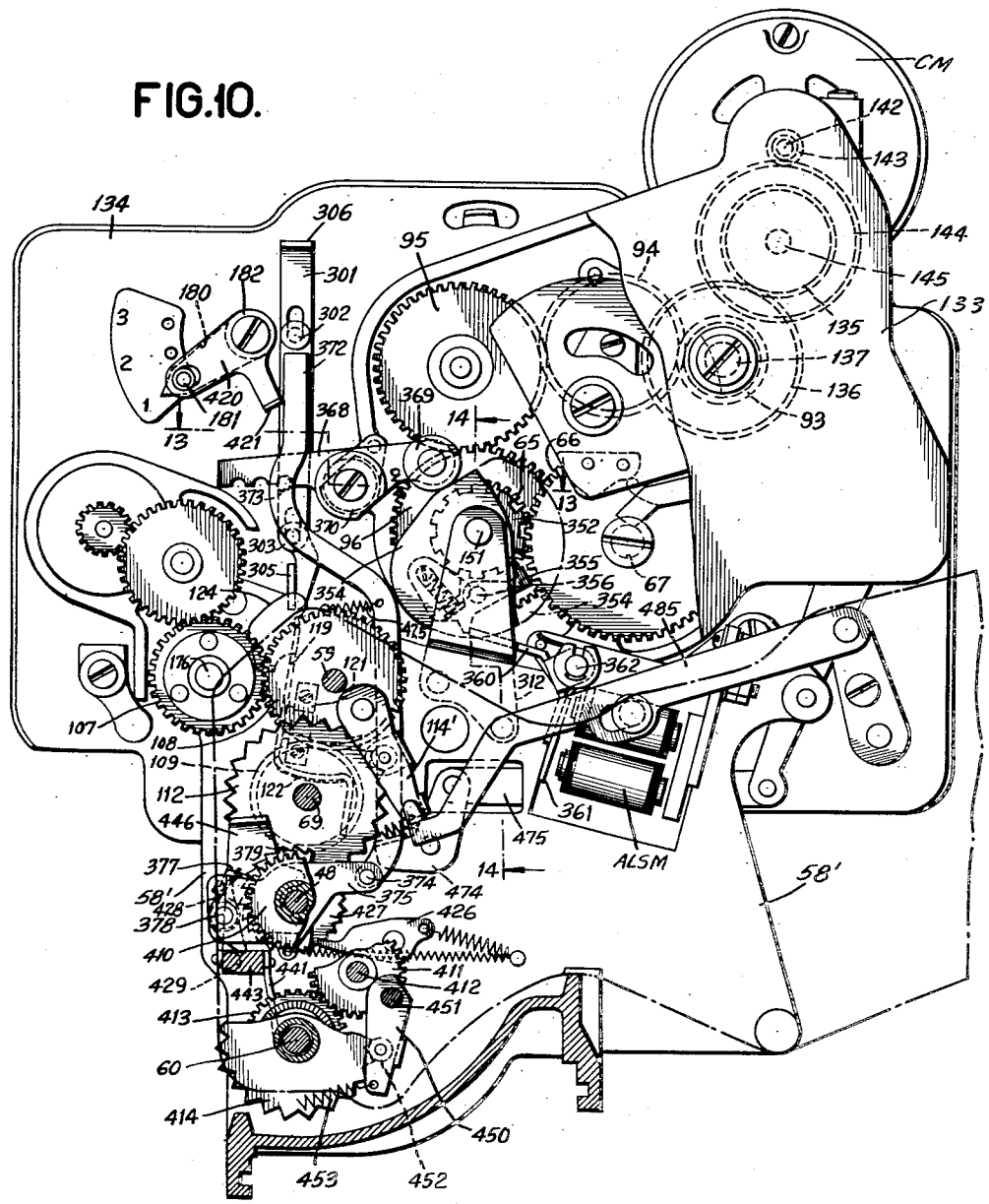
Fig. 10 is an elevation view partly in section showing the line spacing controls associated with the lower platen.

The ejection driving connections continue through a clutch which may be connected at any time in the operation of the machine to cause a check form ejection operation. The driving member of the clutch is the gear 68 driven by either of the pinions 87 or 88, previously mentioned. Referring to Fig. 9, it is noted that gear 68 is pivoted on stud 171 in frame 134 and carries attached thereto a toothed clutch plate 197. Loosely pivoted on the same stud 171 is an ejection cam plate 200. Pivoted on the side of cam 200 is a pawl 198 on stud 199. The pawl is in alignment with clutch plate 197 but is normally held out of engagement therefrom by an armature lever 201 abutting against an extending tail on the pawl. The lever is pivoted at 202 and attached to an armature block 203 associated with ejection control magnet EM.

When the magnet EM is energized, lever 201 is rocked in a clockwise direction, releasing pawl 198 and clutching cam plate 200 to the driving gear 68.

Figure 7:
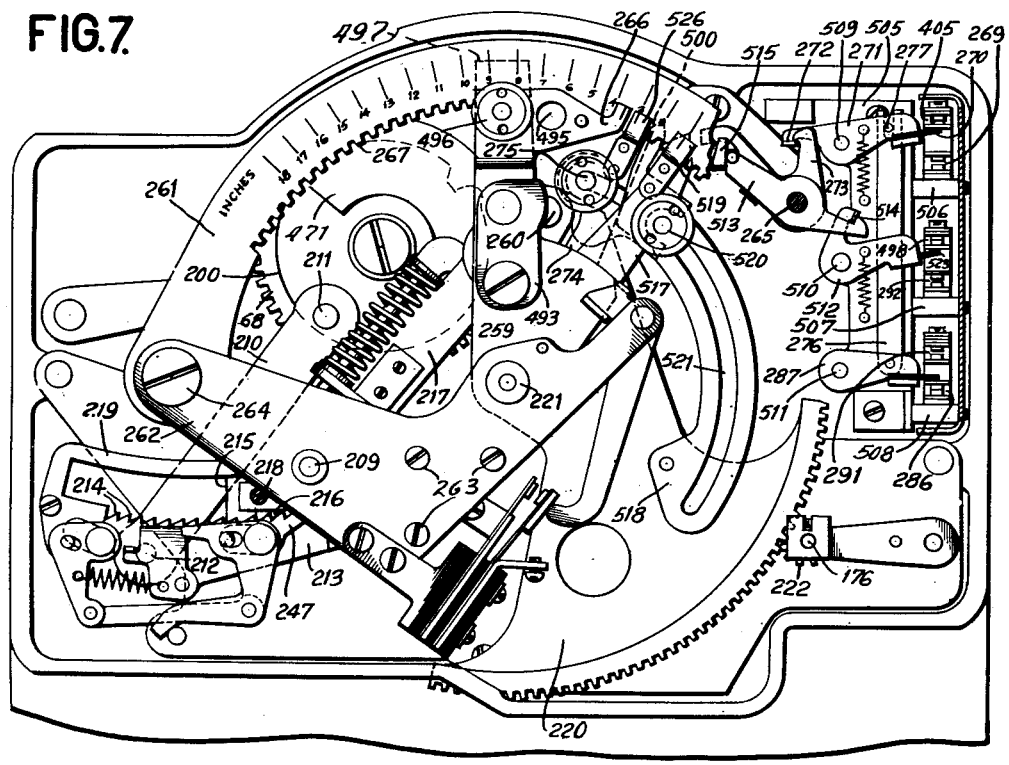
Fig. 7 is an elevation view of the mechanism settable to predetermine the spacing of record forms.

Before describing the other connections for performing an ejecting operation, it is believed well to mention that such an operation may take place at any point during printing down the length of a check strip. Ejection is initiated by energization of magnet EM to feed the check strip from check to check after line spacing operation has skipped the register sheet from block to block. In Fig. 7, the ejecting devices are shown in the normal position. There it is noted that a link 210 is articulated at 211 on side of plate 200 and at the other end it is pivotally connected at 212 to the side of an ejecting frame 213 (Fig. 9) pivoted at 209 on the frame of the control unit. This rocking eject frame 213 is formed in the shape of an arc and carries a similarly shaped plate 247 with a series of teeth 214 cut in the inner side of the arc. Cooperating with these teeth is a block 215 formed with a single tooth 216 adapted to ratchet over the teeth 214 and engage any one of the teeth as a link 217 carrying the block 215 is drawn along the inner surface of the arc during line spacing operation. The block 215 is loosely pivoted on link 217 by means of a stud 218 mounted on link 217. An arcuate guide strip 219, secured to plate 247, cooperates with a groove in the top of block 215 and serves to hold the block in alignment with teeth 214. When the clutch connection comprising pawl 198 (Fig. 9) and clutch plate 197 is made effective by the energization of the magnet EM, the plate 200 is connected to turn in a clockwise direction and thus moves link 210 and frame 213 on to the right with a gradually accelerated motion until the plate 200 has moved through an angle of ninety degrees and then the motion is retarded until the link is practically at rest as the plate reaches a midway position after the initial 180 degrees of motion.

Then the same type of motion is repeated as the plate goes through the final 180 degrees in arriving back to the home position after a complete revolution.

Continuing now with outlining the connections of link 210 to the line spacing devices for the purpose of ejection, it is noted that in the motion to the right, the link carries along the ejecting frame 213 by rocking it in a clockwise direction about the pivot 209. As this is done, the teeth 214 on the eject plate 247 engage the block 215 on the end of link 217 and move this link to the right. The right end of link 217 is connected by a stud 246 to a sector 220 loosely pivoted on a shaft 221. The sector teeth are in mesh with a pinion 222 which may be clutched to the line spacing shaft 176, which, as noted hereinbefore, serves to space the platen through the connections to gear 107 (Fig. 11).

Referring to Fig. 11 it may be seen that shaft 176 is carried in a bushing 223 projecting from center plate 138 and extends in alignment with the hub on gear 107. If the pinion 222 is held out of a normal keyed condition on shaft 176, the motion of sector 220 is not imparted to the line spacing shaft 176. As disclosed in Patent 2,189,025 the pinion 222 may be disconnected and held out of engagement with the shaft 176 when it is desired to prevent ejection.

As sector 220 is rocked step-by-step clockwise to the right in line spacing, the tooth 216 (Fig. 9) ratchets idly over tooth after tooth along the line of teeth 214, while member 213 and plate 247 are in a horizontal position. The sector is stepped along in unison with the spacing of both sheets, because shaft 176 and pinion 222 are operated for each spacing cycle. Then, at any selected point in the operation, and when tooth 216 is in mesh with any of the teeth 214, ejection is performed by rocking member 213, pushing link 217 connected thereto through tooth 216 and block 215, rocking sector 220, turning gears 222, 107, (Fig. 10) 108, 109, shaft 69 and the upper platen 51 (Fig. 11).

The return stroke of sector 220 may be adjustably varied to determine the length of form to be printed in the machine.

The form may be shortened by stopping the sector 220 at any point along its travel counterclockwise towards the left (Fig. 7). For this purpose, a lever 259, pivoted on shaft 221 carries a stopping block 493 cooperating with a stud 260 mounted on the side of sector 220. The upper end of the form length setting lever 259 is adapted to be adjusted around and held in any position along an arc formed by a segmental index plate 261. This index plate is secured at 264 to a frame plate 262 which is held to casting 134 by screws 263, and at the other end the index plate encircles shaft 265. The surface of the index plate is inscribed with long lines representing inches of spacing, and short lines (not shown) representing lines of print spacing. A pointer 266 is formed on the end of lever 259 opposite a gripping plate 497 to indicate the length of sheet selected. The bottom edge of plate 261 is formed with rack teeth 267 which are engaged by a key in the shape of a pinion that is inserted in aperture 495 and turned to move lever 259 and sector 220 to a selected position against the pressure of spring 242.

When the selected position is reached, the lever may be locked in place by turning a nut 496 on a screw passing through the gripping plate. Corrugations on plate 261 and lever 259 lock the lever in place when plate 497 is drawn towards lever 259 to pinch index plate 261 therebetween. As shown in Fig. 7 the lever 259 and sector 220 are positioned to handle check forms three and one-half inches in length.

Carriage controlled contacts

A series of contacts are employed to control the ejection and line space magnets and the tabulating start and stop devices. These contacts are supported on the inside of the casing 134 and near the front of the machine. In Figs. 7 and 9, it is seen that a channel bar 505 supports three blocks 506, 507, and 508 each holding a pair of contacts. The channel is secured to casting 134 and formed to hold stud 509 and shafts 510 and 511 supporting the operating members for the contacts.

The machine is provided with devices for skipping a variable amount of space between the last address line of a check and the number printing line for the first item on the next check. It is described hereinafter how the line spacing magnet LSM is energized to start the skipping operation. After feeding a space equivalent to a block space on the register sheet, space skipping is stopped by opening contacts 498 (Fig. 7) with devices about to be described.

The skip stop contact 498 is held closed by a bell crank 512 fastened to shaft 510. The crank in turn is held by a latch 513 pivoted on shaft 265 and formed with a shoulder engaging a lug 514 on the crank. At the end of the latch is pivoted a flipper 515 on stud 516. The latch is operated by an adjustable tripping lever 517 fastened to an arcuate slotted plate 518 secured to sector 220. The upper end of the lever 517 is formed with a pointed cam face which cooperates with flipper 515 to rock the latch and release the bell crank 512. Because the mounting of flipper 515 is flexible, the latch 513 is tripped and crank 512 moves back ready to relatch even though lever 517 remains directly beneath flipper 515. A pointer 519 on the lever 517 may be set to the proper point along scale 261 so that the first item may be printed at any selected line of the register sheet. As shown, the skip stop is set for one inch which is equivalent to the six lines of space allowed between the block sections. A screw and nut connection 520 extending through lever 517 and a slot 521 in plate 518 may be moved along the slot and fastened in the desired position.

When bell crank 512 is released, a spring urges it in a clockwise direction to lower an insulation finger 523 away from contacts 498 and against contacts 292. Thus contacts 498 are opened and contacts 292 are closed for purposes described more fully hereinafter. The shaft 510 is attached to bell crank 512 so that it also turns to place an arm 524 (Fig. 6) thereon in the path of a roller 525 on the line space operating arm 168. The roller serves to restore the bell crank to the latched position shown in Fig. 7. During space skipping, roller 525 is lowered upon each spacing operation. When unlatched, arm 524 swings clockwise momentarily to rock crank 512 and open contacts 498, but the arm is rocked back counterclockwise by the roller 525 rising to the normal position at the end of the last space skipping operation.

As explained hereinbefore, the ejecting operation is controlled by the energization of magnet EM. This magnet is energized at various times according to the setting of the controls and the closing of contacts to form a completed circuit. For one form of control, the contacts 269 are closed as the printing on the record form approaches the end of a form. For purposes of the present invention, contacts 269 are used to initiate extra line spacing when there is an overflow of the 19th block of the register sheet. These contacts 269 (Fig. 7) are operated by an insulation finger 270 fastened to one end of a lever 271 pivoted on stud 509. The other end of the lever is formed with a lug 272 engaged by a latch 273 pivoted on shaft 265 alongside latch 513. Latch 273 is operated at a selected point in the feeding of a record form, by a cam face on the upper end of a lever 274 loosely pivoted on shaft 221 and held in place by a nut and screw 275 projecting through slot 521. A pointer 526 on the lever indicates the inches of space through which the record form is line spaced before contact operation takes place. The present setting is at three inches, equivalent to eighteen line spaces or three block spaces.

When lever 271 is in the normal position, insulation finger 270 holds contacts 405 closed for reasons set forth hereinafter. However, when lever 274 strikes latch 273, lever 271 is unlatched and free to rock in a clockwise direction as urged by spring. Thus finger 270 is lowered to open contacts 405 and close contacts 269 which are normally in series with the eject magnet EM and adapted to initiate an eject cycle of operation.

The lever 271 is restored by a link 276 connected thereto by a pin and slot formation 277. Individual coil springs restore latches 273 and 513.

When an eject operation takes place, various electrical and mechanical devices in the machine must be operated to control carriage feeding, the operation of the carriage motor, the disablement of the line space latch, and the operation of the tabulating machine. Contacts are operated to cause a delay in the restarting of the tabulating driving connections during an eject operation. Other disengagements must be effected to free the line spacing shaft from ratchet connections during ejection. These and other controls are effected by the cam faces formed on the periphery of plate 200 (Fig. 9) which, as is noted from the foregoing section of the description, turns through a complete clockwise revolution during an ejecting operation.

Cooperating with the cam plate 200 is a contact operating lever 279 pivoted at 280 on plate 138 and drawn by spring 281 into contact with the periphery of the cam plate. The upper end of the lever 279 is formed with a projection 282 which acts as a cam face and also as a latch in cooperating with a notch 283 cut in the periphery of plate 200. Early in each eject cycle, the side of notch 283 acts as a cam face to rock lever 279 in clockwise direction, moving down an arm 284 connected thereto by pin and slot connection 285. The arm is fastened to one end of shaft 511 the other end of which carries a member 287 with an insulation finger 288 for opening and closing contacts 286 and 291.

The initial movement of cam lever 279 serves to open contacts 286, but contacts 291 are closed later in the operation when a projection 289 on cam plate 200 strikes the end 282 of the lever, rocking it further in a clockwise direction and lifting finger 288 against contacts 291. This final lifting movement serves also to restore lever 271 (Fig. 7) which is rocked counter-clockwise by link 276 attached to member 287 by stud 290.

The disengaging means for the upper platen

Devices are provided whereby the driving connections to the upper platen may be manually disconnected so that it may be turned in either direction to thread the check strip thereon. Referring to Fig. 11, it is seen that the drive gear 109 is formed with a collar having clutch teeth normally engaged with teeth on a similar collar attached to the star wheel 112 fastened to the upper platen shaft 69. Star wheel 112 has a fixed axial position on shaft 69 but gear 109 is free to be moved back and forth axially along shaft 69 to disengage and engage the drive connections through gear 108 which remains in mesh with gear 109 in both of the shifted positions. Attached to the side of gear 109 is a collar 123 with a circular groove in which extends a portion 122 of a declutching lever 119 pivoted at 120 on a bearing standard 121 secured to the auxiliary side frame 58'. This lever 119 is normally urged in a counter-clockwise direction (Fig. 11) about center 120 and has at its upper end a vertical projection 124. Because projection 124 is not accessible for manipulation, an operating extension is provided in the form of a slide 301 formed with a pair of slots encircling studs 302 and 303 projecting from the casting frame 134. A spring 304 normally pulls slide 301 upward, so that an overturned cam projection 305 at its lower end, normally allows the lever 119 to assume the normal clutching position shown in Fig. 11. However, when the upper extension 306 on slide 301 is grasped and depressed, cam extension 305 cooperates with projection 124 on lever 119 and rocks it in a clockwise direction to disengage gear 109 from the clutch collar on shaft 69. As long as slide 301 is held down, the upper platen 51 may be turned independently of the automatic feed connections and the position of the check strip thereon may be varied as desired.

Line spacing connections to lower platen

It is pointed out hereinbefore how the connections are established from the Carroll automatic carriage feed devices to the upper platen. Other connections are provided as an auxiliary line spacing drive to operate the lower platen in unison with the line spacing movement of the upper platen without imparting the long feed, or what is known as "ejecting movement," that is carried through the connections established to the upper platen. Spacing is in unison, because the two line space control magnets are wired in parallel.

Figure 13:
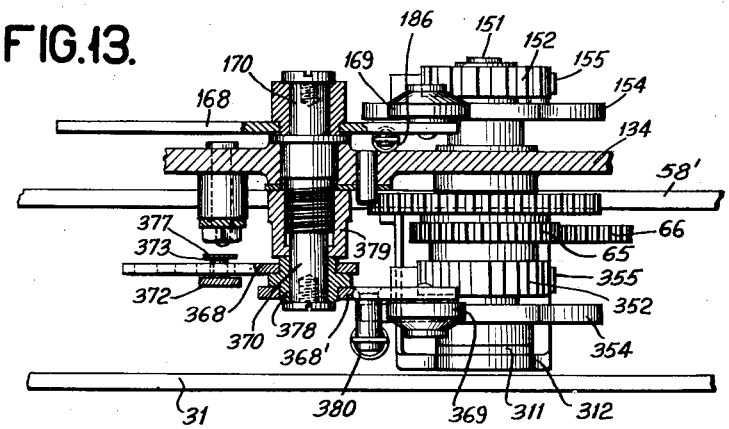
Fig. 13 is a sectional plan view taken along line 13—13 in Fig. 10 and showing the clutch connections for the two line spacing mechanisms.
Figure 14:
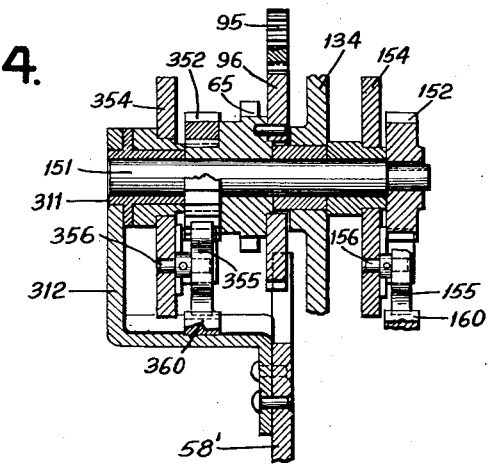
Fig. 14 is a detail view in sectional elevation taken along line 14—14 of Fig. 10 and showing the drive connections for the two line spacing clutches.

Referring to Figs. 13 and 14, it is seen that the line space drive shaft 151, which carries the operating gear 96, now extends on both sides of the frame 134 instead of merely extending inwardly to carry the usual line space clutch 152, Fig. 6. The outer end of shaft 151 is supported on a bushing 311, Fig. 14, carried by a bracket 312 fastened to the auxiliary side frame 58'. Of course, on the inner end of shaft 151 is fastened the clutch wheel 152, and alongside it is the freely mounted cam 154 as explained hereinbefore. On the opposite end of shaft 151, between bracket 312 and frame 134, are provided the drive connections for line spacing the lower platen. Attached to shaft 151 is an auxiliary clutch gear 352 alongside gear 65 which is fastened to the drive gear 96. Adjacent the toothed clutch gear 352 is a cam 354 loosely pivoted on the bearing 311 secured to bracket 312. This cam carries a clutching pawl 355 pivoted at 356 on cam 354. A spring pressing against pawl 355, Fig. 10, tends to engage it with the clutch gear 352, but a downward extension on the pawl is normally obstructed by the end of a lever 360 connected to the armature 361 of the auxiliary line spacing magnet ALSM. The lever 360 is pivoted on a stud 362 and urged in a clockwise direction (Fig. 10) against a stop pin.

When the magnet ALSM is energized, the lever 360 is rocked in a counter-clockwise direction, releasing the pawl 355 which then engages the clutch gear 352, thus connecting the cam 354 to the drive shaft 151. When cam 354 rotates, it operates a lever 368 through a roller 369 on the lever and in cooperation with the periphery of the cam. The lever 368 (Fig. 13) is pivoted on an extension 370 projecting from stud 170 and is provided with an extending arm which is cut to form three notches. A link 372, placed adjacent the lever 368, carries a pin 373 which is adapted to cooperate with any one of the three notches in lever 368. The lower end of link 372 is pivotally connected at 374 (Fig. 10) to a line spacing plate 375 loosely mounted on the platen suspending shaft 48. The plate 375 carries a feed pawl 377 pivoted at 378 on the plate and adapted to cooperate with a ratchet wheel 379 fastened to shaft 48.

In Fig. 11 it is seen that shaft 48 projects inside the carriage frame 31 and on it is carried the gear 410 meshing with an idler gear 411 pivoted on a stud 412 extending from the lower platen swinging frame 46. This idler gear 411 also meshes with a gear 413 loosely mounted on the end of the lower platen shaft 60. The gear 413 is formed with a collar having projecting clutch teeth cooperating with similar teeth on a star wheel 414 secured to shaft 60.

From the connections mentioned it may be noted that as cam 354 (Fig. 10) is rotated, the lever 368 is rocked in a counter-clockwise direction pushing link 372 downward and rocking the plate 375 in a clockwise direction, so that pawl 377 advances ratchet wheel 379 and gear 410 in a clockwise direction, turning the idler gear 411 counter-clockwise, and finally rotating gear 413 and the connected lower platen 10 in a clockwise direction.

The amount of motion imparted to the lower platen is determined by the adjustment of the upper end of link 372 (Fig. 10), so that pin 373 cooperates with one of the three notches in the lower edge of lever 368. A manual adjustment of link 372 is brought about by means of a lever 420 fastened against the side of the usual line space selector arm 180. Lever 420 is formed with an extension carrying a projection 421 abutting against the side of link 372. Arm 180 and the connected lever 420 may be set to any of the three indicated line space selecting positions for causing one, two or three spaces of feed in connection with both forms of record strips. A spring 425 tends to hold link 372 in cooperation with extension 421.

A detent 426 cooperates with a positioning ratchet 427 secured to the operating ratchet 379 to hold the line space adjustment made by pawl 377. A coil spring 428 looped around pivot 378 of line space pawl 377, tends to engage the pawl with ratchet 379, but, in the normal position of the carrying plate 375, the lower end of pawl 377 cooperates with a stud 429 which cams the pawl in a counter-clockwise direction to hold it out of the path of the teeth on ratchet 379.

*Devices for disconnecting the drive to the lower platen*

The platen operating gear 413 (Fig. 11) is provided with a grooved collar 440 in which there projects an operating arm of a disengaging lever 441 pivoted at 442 on a bearing block 443 secured to the rocking frame 46. Gear 413 and collar 440 are free on shaft 60 and may be moved outward axially to disconnect gear 413 from the clutch teeth on the star wheel 414. The connection is normally maintained because a coil spring 444 on shaft 48 presses against the side of lever 441 which encircles shaft 48 and extends to form a finger piece 446. When extending portion 446 is grasped and rocked clockwise about pivot 442 against the tension of spring 444, the lower end of the declutching lever 441 shifts the gear 413 out of cooperation with the star wheel 414 and disconnects the drive connections so that lower platen 10 may be rocked and turned in either direction by hand to assemble or remove the register strip.

Cooperating with star wheel 414 (Fig. 10) on the lower platen shaft 16 is a detent arm 450 pivoted at 451 and carrying a roller 452 engaging the teeth on the star wheel. A spring 453 tends to hold the detent into cooperation with the star wheel and locate the lower platen in any one selected line space position.

*The line space counting levers and check width determining pointer*

The machine is provided with a series of contact operating pointers settably mounted in the automatic carriage unit to determine the number of line spaces per block and to operate also when an overflow condition exists in feeding from one block to another. Referring to Fig. 7, it is seen that the pointer arms 517, 274 and 266 mentioned hereinbefore are set to select the spacing of 1 inch, 3 inches and 3½ inches respectively. As already explained, in the ordinary use of the automatic carriage, lever 517 determines the position in which line space skipping is terminated and item printing is initiated, and then after a series of printing and line spacing operations, the other lever 274 usually comes into action to determine the length of the printing area desired, after which ejection is to be initiated. These two levers 274 and 517 are used for other purposes of line spacing control in the present invention. The lever 517 is set with its pointer on the 1 inch or 6 line space marking to determine the point at which line spacing is to be terminated should the recorded matter involve less than 6 lines of print. When the point of lever 517 operates the crank 513 to release member 512, open contacts 498 and close contacts 292, the line spacing operation of both the check strip and register sheet is terminated, but an ejection operation is initiated to feed the check strip along from the end of the printed matter on the one check to the record starting position on the following check.

Provisions are made to take care of the termination of line spacing of the two record strips when there is an overflow from one block into the second block. A long address on the check strip causes an overflow out of one block space on the register sheet and calls for additional spacing to bring up the top of a third block on the register sheet into print receiving position. Note the long address of the second check (Fig. 2) and the corresponding printing area on the bottom of the register sheet (Fig. 3). For this purpose an auxiliary trip pointer 500 (Figs. 7 and 8) is provided to cooperate with the contact release crank 513. This auxiliary pointer 500 is shaped to straddle the center of the securing nut 520 and is held thereon by lever 274 which abuts against the left side of pointer 500 when the lever is set to the 3 inch position. Pointer 500 coincides with the 2 inch setting position so that when an overflow condition exists, carrying the record material beyond the six lines allocated to the one block, then the first lever 517 passes crank 513 without effective stopping operation of the line spacing control because space skipping has not started. It is under such overflow conditions that the second and special pointer 500 comes into play to terminate line spacing operation after twelve lines have passed the recording position. Then pointer 500 operates crank 513 in the same fashion as lever 517, that is, to terminate line spacing and initiate check ejection through the operation of the contacts 498 and 292.

Figure 8:
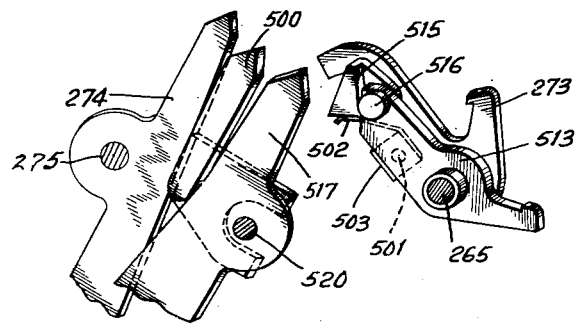
Fig. 8 is a detail perspective view of the tripping devices for controlling the spacing of the record forms.

The end 515 of crank 513 is made flexible so that the crank may rock freely and reengage the contact trip member 512, even though either of the contact points 500 or 517 may be positioned directly under the point 515. The end 515 is shaped as shown in Fig. 8 and pivoted on stud 516 located near the end of crank 513. Also attached to the crank is a thin leaf spring 502 bent so it may be riveted at 501 on the side of the crank as positioned by an offset shoulder 503. Spring 502 normally urges the point 515 in a clockwise direction to hold it in a position where the levers are required to rock the point down before they are effective to rock the crank. After either of the points pass the end of the flexible point 515, the spring 502 becomes effective to swing it up and around in a position away from the operating levers so that crank 513 can rock counterclockwise into the latching position.

Arm 274 does not have the usual "end of form" control in the present machine. Instead it cooperates with crank 273 to release lever 271 and reverse the position of contacts 405 and 269 for line spacing and ejection control under unusual block counting conditions. This lever 274 comes into play under conditions where there is an overflow from the nineteenth block, as shown at the top of Fig. 3, necessitating the shifting of the register sheet from the top of the nineteenth block to the first line of the following form, instead of carrying it from the top of the twentieth block to the following form. The various controls exercised through the shifting of the contacts by the control levers are explained more fully hereinafter with reference to the wiring diagram.

Lever 259 serves to perform the usual functions of determining the length of the ejected forms. In the present case it is set at the 3½ inch mark to coincide with the height of the check forms on the check strip.

The step switches for line counting and block counting

A contact device is provided to call into action, controls which are to be effective after six lines of space have passed the printing position. A similar contact device is provided to bring into play, special controls after the counting of 20, 21, and 22 of the blocks spaced along the register sheet. The line spacing controls are varied according to the presence or absences of overflow conditions in the nineteenth and twentieth block spaces. It is for this purpose that a step switch is provided to make contact with separate leads after passing the nineteenth block position. Since the line counting and block counting step switches are similar in construction, it is believed desirable to limit the description to one of such devices.

In Fig. 15 is shown the form of Strowger step switch adapted for the purpose of the present invention. A frame 381 carries insulation strips supporting a series of 26 contact projections 382 arranged radially around a semi-circle formed by the frame. Twenty-five of the contact extensions 382 are provided for operating leads, and the other contact 383 is provided in the home position for the resetting position of the switch. Attached to cross frame 381 is a bridge 384 on which is a fulcrum 385 carrying the double ended contact arms 386 secured to the operating ratchet 387. Cooperating with ratchet 387 is a pawl 388 pivotally mounted on an armature bail 389 fulcrumed at 390 on the frame 391 attached to the main frame 381 and holding the operating magnet SSM. Every time the magnet is energized, the armature bail 389 is rocked about center 390 in a counter-clockwise direction moving pawl 388 upward and retracting it with respect to ratchet 387. On deenergization of the magnet, a spring 398 serves to rock frame 389 in a clockwise direction to actuate the ratchet and step the contact arms 386 from cooperation with one of the extending points 382 over to the next contact point.

Mounted on a fixed frame 392, fastened over the top of magnet SSM, is a pair of interrupter contacts 393, the upper blade of which extends in the path of an insulation button 394 fixed to the top of armature frame 389. Whenever the armature is rocked by energization of the magnet, button 394 is raised against the contact blade to open contacts 393 and break the circuit to the operating magnet.

As ratchet 387 is stepped around from one position to another, a detent 395 fastened to bridge 384 extends into cooperation with the ratchet teeth to yield and allow them to pass but prevent backward rotation of the contact arms.

Wiring Diagrams

The operating controls of the machine are shown in a series of figures 17—17g wherein they appear as electrical relays and contacts governing the connections between the automatic carriage and the tabulating machine. The relays found in the ordinary alphabet tabulator are designated with the letter R, while the relays added for the purposes of the present invention are identified by the letter G appearing before the differentiating numbers. New cam contacts are also distinguished by the use of the letter G as part of their identification.

The timing for a number of controls are indicated at the top of Fig. 18. There it is seen the intervals with which the card brushes make contacts through the perforations in the card. Next, the operation of the lower card lever LCL is illustrated. The third line is concerned with the timing of all contacts operated by the minor and major group control magnets MI and MA. The fourth line relates to the usual contacts in the accumulator to direct carry impulses and prevent back circuits as illustrated in the diagram of Patent 2,079,418. The three sets of total switch plate contacts TSA, TSB and TSC are released by magnets TSP16, TSP7 and TSP8 and mechanically restored in the manner shown in Fig. 12 of Patent 2,079,418. There are three other sets of cam contacts CF, CB and PM, the operations of which are illustrated diagrammatically in Fig. 18. The CF cams are effective whenever cards are feeding. The CB cams are constantly operated and the PM cams are operated as an accompaniment to printing operation.

After the two record forms, the check strip and the register sheet, are assembled on the feeding platens and the control cards are placed in a magazine, operation is started by depressing the start key KIU shown in Fig. 17a. Upon closure of start key contacts KIU, a circuit is completed from the one side of the line 701 through a wire 702 through card feed contacts CF12, contacts KIU, card feed clutch magnet CFC and wires 703 and 704' to the other line 700. This circuit serves to connect the drive for feeding the first card out of the magazine and up to the upper brushes in the usual way as disclosed in Patent 1,976,617. At the same time that one set of start key contacts KIU are closed, another pair of start contacts KIL, Fig. 17a, are operated by the same key and are also closed for the purpose of picking up circuits for sustaining the start circuit. The auxiliary start circuit may be traced from wire 702 through wires 704 and 705, contacts KIL, wire 706, the pickup coil of relay G16 and through wire 704' to the line 700. The related holding coil of relay G16 then operates to close associated contacts G16A to set up a holding circuit through holding coil G16, contacts G16A, wire 707, switch SG15, wire 708, stacker stop switch STK, the hopper stop switch HS, wire 709 and wires 705, 704 and 702 to line 701. The last mentioned circuit is prepared in order to close the contacts G16B associated with the holding coil of relay G16 and effective after the first starting operation to continue the operation in the machine by circuits about to be described.

After the first start cycle, the card is brought up to the upper brushes and then the start key is operated again to close contacts KIU and establish another card feed cycle which may be traced through the start circuit already mentioned, but in addition thereto, a parallel circuit is established through the action of relay R5, Fig. 17a, which on the first cycle closed its associated contacts R5BL because wire 710 connected to relay R5 is in parallel with the card feed clutch magnet circuit which is made effective as already explained. The card feed holding circuit may be followed from line 700 through wire 704', relay R5, contacts R5BL, wire 711, contacts LCR1A closed by a card lever relay LCR1 as the card appears under the lower brushes, and then through cam contacts CF12 and wire 702 to the other line 701. When cam contacts CF12 break, the circuit is maintained through other shunt connections involving the contacts G16B already mentioned. The shunt circuit around contacts CF12 comprises normally closed reset relay contacts G39BL, contacts G16B, G10A, G11B, G24A, stop key contacts K2, the normally closed contact G7B, the closed side of contact G6B and wire 704 to the other side of the shunt connection. The feeding circuit now established, serves to not only hold the relay R5 sustained in its effect but also maintains energization of feed clutch magnets CFC so that the first card is brought beyond the lower adding brushes at the same time that the second card passes under the upper brushes. Resetting is avoided when the first card passes under the upper brushes. A circuit is picked up and goes from line 701, Fig. 17, wire 770, contacts LCR3B, plug socket L, and plug wire to socket 771, Fig. 17e, contacts M18 closed after "0" by the class selection magnet M, the first pickup coil of relay G7 and wire 740 to line 700. Relay G7 then picks up contacts G7A with its holding coil, Fig. 17a, and energizes a relay G8 through the circuit from line 700, Fig. 17a, wire 704', relays G7 and G8, contacts G7A, wire 772 and line 773, Fig. 17c, through cam contacts CB24 and to line 701. Relay G8 when thus made effective, operates to shift contacts G8B, Fig. 17e, and disable the pickup coils of the usual total enforcing relays R26, R27 and R28 in series therewith. If switch SG17 is closed, contacts G8B are shunted for control with all cards as in ordinary operation.

As shown in Fig. 1, the first card 1, which is the check number card, lacks the issue number perforations which are found in all cards following the first card. These issue number perforations are sensed by brushes plugged in series with the usual group change detecting controls and connections are made so that when a change occurs in these number perforations as between first and second cards, a major group change is effected to cause a total taking cycle. It should be noted that this first unusual total cycle is for the purpose of control only, and nothing is printed because the matter entered from the first card is information that is not to be printed on the total cycle. The control cycle is provided for the purpose of providing a group indicating cycle in connection with the analysis of the first check number card. The number on this first card is set up in an accumulator from which a reading is to be taken on the first card feed cycle after the special total cycle.

Group control

During each cycle, a circuit (Fig. 17f) forms from line 700, through wire 764 and relay coils R169 to R175 in parallel, through cam contacts CF19 and wire 721 to line 701. The brushes UB are connected to plug sockets 761' and plug wire connections 761 are made from the sockets connected to the brushes UB sensing the issue number field which is the group indicating control field, to plug sockets 762. The brushes LB are connected to plug sockets 724' and plug wire connections 792 are made from the sockets of the brushes LB sensing the group indicating field, to sockets 793. When an upper brush senses a perforation in a group indicating column, a circuit forms as follows (Fig. 17f). Line 701, cam contacts CF11, contact roll 760, brush UB, a plug connection between sockets 761' and 762, pickup coil R130, the lowest relay contacts R172B (coil R172 has been energized by the preceding circuit), contacts R2A, wire 829, Fig. 17g, cam contacts CF17, and 18, cam contacts CB1, 2, 3, and 4, to line 700.

A similar circuit is established through the lower brush pickup coil R129, extending from line 701, wire 721, through relay contacts LCR1B, cam contacts CF2, the contact roll 723', brush LB, plug connection 792 between sockets 737 and 793, pickup coil R129, contacts R169A, and to line 700 through the same path as in the preceding circuit.

Pickup coils R129 and R130 respectively close contacts R129A and R130A to energize holding coils R129 and R130 (Fig. 17f) through cam contacts CF30.

The holding coils R129 and R130 (Fig. 17c) hold contacts R129B and R130B in shifted position until contacts CF30 open after the 9 to 0 sensing period of the cycle.

The foregoing description of relays R129 and R130 is general to all group control sections. For major control by issue number, a plurality of such pairs is used.

In a similar fashion, other pairs of control coils are energized under control of perforations in group number representing columns under the lower and upper brushes. One or more pairs of relays R129', R130' is used for minor control to detect changes in account numbers. A single pair of such minor control relays also serves to detect the special perforations in address cards. Assuming that a certain group column is for minor control, the C contacts of the holding coils are connected as shown to plug socket 800 from whence a plug wire is connected to minor shunt plug socket MIN. Other similar connections are made from selected control contacts to the INTER and MAJ shunt sockets. If the perforations in the first group indicating columns agree, contacts R129C and R130C will be simultaneously shifted from normal condition and will not close a circuit path. If either of these contacts is shifted first, a circuit path is completed. For instance, if contacts R129C have been shifted first, then the following circuit will form (Fig. 17c):

Line 701, wire 765, contacts CB17 and CB18, the normally closed side of contacts R130C, the upper, now closed side of contacts R129C, socket 800, plug connection to minor shunt socket MIN, pickup coil R126, wire 768, line 700.

Pickup coil R126 closes contacts R126A to form the circuit of holding coil R126 through cam contacts CB24.

In a similar way, the intermediate pickup coil R127 and the major pickup coil R128 may be energized upon failure of the intermediate and the major indications to agree.

Holding coil R126 holds contacts R126B closed to energize minor auto control pickup coil R26 as follows (Fig. 17a):

Line 701, Fig. 17, wire 825, contacts INT7, MI7, total eject contacts G63B, wire 831 (Fig. 17a), switch SG13, contacts G20AU, wire 808, Fig. 17e, switch SG2, contacts G8B, cam contacts CF1, G70A, R126B, minor auto control switch S4, pickup coil R26, contacts CB19, wire 740 and line 700. Relay G63 is effective at this time to hold contacts G63B shifted because the total eject socket TE (Fig. 17) is plugged for minor control. Relay G20 is also active to close contacts G20AU because it is operated for minor group changes as described hereinafter.

Holding coil of relay R26 closes contacts R26AU (Fig. 17c) to establish a circuit from line 700 through wire 784 parallel holding coil R26 and MI coils, contacts R26AU, wire 810, cam contacts PM15, to line 701.

In a similar way, holding coil R27 and INT coils and holding coil R28 and MA coils are energized under intermediate and major control, these circuits extending, however, through PM16.

The minor controls serve a dual role and are connected to sense the special perforations in the address cards as distinguished from the dividend cards and also distinguish between cards of different accounts. The intermediate control is not plugged to any card field but is connected to the block counter to get a total cycle after the 20th block on a sheet. The major control is used as a check on the issue number perforations in all cards.

*Group indication*

Upon detection of the issue number group change between the first and second cards, circuits are set up for group indication in the usual way. The relays provided for this purpose are found in Fig. 17b. There it is seen that major control relay MA when energized closes the lower contact MA2 to make the group indication relays G1 and R7 effective through a circuit which may be traced from line 700, through wire 712, the first pickup coil of relay G1, normally closed contacts G3B, cam contacts CB25, wire 713, upper contacts MI3, contacts INT2U, wire 714, switch S9, lower contact MA2, switch SG1, wire 715, wire 716, normally closed contacts G66B, through cam contacts CB21 and wire 717 to line 701. The group indication circuits are held for another cycle through a holding circuit which may be followed in Fig. 17a. There it is noted that the holding coil of relay G1 is energized through contacts G1AL closed by the pickup coil of the relay and held by the sustained energization of the holding coil. The circuit through relay G1 flows from line 700 through wire 704', relay G1 holding coil, contacts G1AL, wire 718, normally closed contacts G2AL, wire 719, cam contacts CFG2, and wire 702 to the line 701. When the last address card of the first group passes, contacts G2AL are opened to restore relay G1 when relay G2 is operated as an incident to record shifting as explained hereinafter under "Skip initiation." Relay G3 is energized with the holding coil of relay G2, and it opens contacts G3B to prevent energization of relay G1.

Before explaining how the check number is added in an accumulator and read therefrom as a total to give a group indication, it will now be pointed out how the printing action is initiated through the operation of the group indicating relay. Closure of contacts G1AU, Fig. 17b, by the holding coil of relay G1 energizes the usual print clutch magnet PCM as follows: line 700, wire 712, wire 720, print clutch magnet PCM, contacts R26AL, normally closed contacts INT5, contacts R5BU closed by energization of relay R5, cam contacts CB20, contacts G41B, contacts G1AU, card lever contacts LCR1C and line 701. A clutch is provided between the main driving mechanism and the type bar moving means. The energization of magnet PCM causes the printer operating devices to be clutched to the main operating mechanism, so that the type bars and associated controls are operated.

The check number figure is entered into a part of one of the accumulators as the perforations on the first card are sensed while it passes under the lower brushes LB. A sample adding circuit may be traced on Figs. 17f and 17g as follows: through line 701, Fig. 17f, wire 721, card lever relay contacts LCR1B, card feed cam contacts CF2, wire 722, common brush 723, contact roll 723' through the perforations in the card establishing differentially timed contact by lower brushes LB, plug socket 724', plug wire 724 to socket 725, Fig. 17g, cable 726, positive entry selection contacts R47L closed for adding, wire 728, the usual back circuit preventing contact 729, wire 730, the normally closed side of total switch contact TSA, accumulator magnet AC and wire 732 to the circuit breaker contacts CF17, CB4, etc., and then to the other side 700 of the line. The circuit for operating contacts R47L may be followed through the control relay R47 as follows: Referring to Fig. 17f, line 701, wire 721, lower card lever contacts LCLC, wire 735, plug socket 734 and a plug wire reaching to socket 734', Fig. 17d, relay R47 and through circuit breaker contacts CF23, and wire 839 to line 700.

The check number card is provided with a special perforation 736, Fig. 1, which effects control for connecting the readout devices of the accumulator so that the check number added therein may be read out and printed on the check and register sheets. As the first card passes under the lower brushes, the brush connected to plug socket 737, Fig. 17f, detects the appearance of the special perforation, and a circuit is completed passing through plug wire 738 over to plug socket 739, Fig. 17e, through contacts M20 closed at the "X" index point on every card feed cycle by usual class selection relay M, and then through the second pickup coil of relay G42, through wire 740 to line 700. Referring to Fig. 17b it is seen that the action of relay G42 results in closing contact G42A to establish a holding circuit and at the same time makes connections for the energization of relay G43. The circuit is from line 700 through the holding coil of relay G42, contacts G42A, wire 741, cam contacts CF22, wire 742 and wire 717 to line 701. At the same time that the circuit is established through relay G42, another parallel branch of this circuit is connected through relay G43, because at this time switch SG16A is positioned to contact with a wire 743 connected to one of the points of contacts G42A which are closed and held closed by the action of relay G42.

It has been explained that the check number of the first card is added into an accumulator at the same time that a total taking cycle was initiated to set up a group indicating cycle. This is done so that printing connections are established for moving the type bars in synchronism with the movement of an impulse emitter to direct reading impulses through the readout commutator associated with the part of the accumulator holding the check number. On the cycle following the total cycle, an impulse emitter E, Fig. 17g, is brought into effective control by the closing of a pair of contacts G43AL which are operated by the relay G43 already mentioned, the action of which is sustained by relay G42 over into the group indicating cycle. An example of one of the total digit readout cycles may be followed with reference to Fig. 17g where it is seen that a wire 744 is connected from line 701 to contacts G43AL and then through wire 745 to the common segment 746 of the emitter E having a brush structure 747, contacting successively with the digit segments 748 leading through lines 749 to the various denominational readout commutator inserts 750 for the various denominations. Cooperating with these inserts are accumulator wheel brushes 751 positioned to represent the check number. The current continues through the wire 752 which is connected between the common contact strip in contact with the brush 751 and plug socket 753 to which is attached a plug wire 754 connected at its other end in a socket 755 through which the current is carried along wire 756 and through the normally closed side of the total shift contacts TSC and then through print magnet PM, wire 732, the circuit breaker contacts, and line 700.

At the same time that the check number is being read out of one accumulator during the group indicating cycle, the second card 2, of the set of cards shown in Fig. 1 is being fed under the lower brushes LB, and as it does so, the perforations thereon representing the number of shares and the amount of the dividend are read into two other accumulators wherein subsequent operations under control of other dividend cards 2' will cause further addition of the numbers of shares and amounts of dividends to be totalled and printed. The adding circuits directed through these amount and share number perforations are the same as the one already described with the exception that they run to different orders and different accumulators so that separate accumulations may be stored and later read out and printed as a total before name and address printing takes place. Line spacing does not accompany the dividend adding cycles because the line space magnets ALSM and LSM (Fig. 17) are in series with PM cam contacts that are closed only when print clutch magnet PCM is operated for listing.

Referring to the series of cards illustrated in Fig. 1, it is seen that the first name card 3 differs from the preceding cards by the provision of a special perforation 758 which is provided to cause a group change and total printing cycle as a result of its detection. These special group control devices working through the analysis of perforations 758 are designed to call for a total cycle only when the X punched card follows the dividend card without such a perforation 758 and it is arranged so that it does not function when the reverse is true, that is, when the last address card is followed by the first dividend card of the second group. A pair of control relays R130, R129 separate from the control relays used for issue number detection and major control are provided for X punch detection and minor control, as about to be described. Returning now to the initiation of the total cycle by detection of the first perforation 758 by the upper brushes in the 80th column and the circuit therethrough, which may be followed from line 701, Fig. 17f, through cam contacts CF11, common brush 759, contact roll 760, brush UB, socket 761, plug wire 761, socket 762, the pickup coil of relay R130, contact R172B closed on a feed cycle, wire 763 and card detecting relay contacts R2A and through wire 829 and the breaker contacts, Fig. 17g, to line 700. The holding coil of relay R130 then reverses related contacts R130B, Fig. 17c, to establish a circuit through the pickup coil of the minor control relay R126 by connections which may be followed from line 701, wire 765 through circuit breaker contacts CB17 and CB18, upper contact R130B, lower contact R129B, plug wire 766, Fig. 17d, and through the normally closed side of contacts R30B, plug wire 767, Fig. 17c, socket MIN, minor control pickup relay R126 and wire 768 to line 700. This minor control relay R126 serves to operate in the usual way to close contacts R126B, Fig. 17e, in series with the pickup coil of relay R26. The circuit includes line 700, wire 740, cam contacts CB19, pickup coil R26, switch S4, contacts R126B, contacts G70A, cam contacts CF1, contacts G8B, wires 806, 776 and 807, Fig. 17f, card lever contacts LCR1B and wire 721 to line 701. A holding circuit is set up for relay R26 by the closure of contacts R26AU. The complete circuit contains line 700, wire 784, holding coil R26, contacts R26AU, wire 810, cam contacts PM15, and wires 811 and 765 to line 701.

At the time operation of minor control magnet R26 is initiated, the related contacts R26B, Fig. 17c, are closed in series with the pickup coil of relay G23. The circuit through the pickup part of relay G23 may be followed from line 700 through wire 784, the pickup coil of relay G23, contacts R26B, wire 810, cam contacts PM15, wire 811, wire 765 and line 701. The holding coil of relay G23 is then energized by the following circuit; line 700, wire 784, holding coil G23, contacts G23AL, cam contacts PMG1 and wire 765 to line 701. Relay G23 closes contacts G23AU to complete a circuit for the card feed control relay G24 as follows: line 700, wire 784, relay G24, contacts G23AU, wire 765 and line 701. Relay G24 operates to open contacts G24A, Fig. 17a, in series with the card feed clutch magnet CFC so that card feeding is suspended while total recording is taking place.

Minor control relay R126 also serves to condition circuits for initiating a total printing cycle. It is already noted that relay R126 calls relay R26 into operation; and with reference to Fig. 17c it is seen that minor control magnets MI are wired in parallel with relay R26 and energized therewith. A magnet MI is effective to operate total switch connections to select total taking. The switching circuit may be followed from line 700, Fig. 17b, through wires 712 and 712a, total switch magnets TSP7—TSP12, lower contact M13, switch S8, wire 716, relay contacts G66B, cam contacts CB21, wire 717 and line 701. To prepare for total printing, the switch magnet TSP8, Fig. 17g, shifts contacts TSC to connect the print magnets PM to the transfer contacts 87S closed differentially by the restoring accumulator wheels. The total printing circuit includes line 701, cam contacts CB11 and CB16, wire 263S, accumulator transfer contacts 87S, cable 306S, plug wire 307S, lower contacts TSC, print magnet PM, wire 732, the circuit breaker contacts and line 700.

From the foregoing it is clear that the minor control devices operate in the usual way to suspend card feeding operation and initiate a total printing cycle which is started by energizing the magnet for clutching the accumulator wheels so that they are moved further in the adding direction towards the home position during which operation, at differential times, impulses are directed from the carry and total contacts through the print control magnets PM to stop the type bars in position to print the total amount of all dividends and numbers of shares accumulated with reference to the items of the account which is about to be identified by alphabet printing on the check. The dividend accumulators are reset by being declutched at the zero position by the actuation of the usual subtraction magnet SM. As explained in Patent 2,079,418, the transfer contacts, operated by an accumulator wheel going to zero, are connected to the declutching magnet for a clearing total.

Following the printing of the share number and amount figures, the name and address cards are analyzed and the code perforations therein are used to control alphabet printing devices as shown in the Mills et al. Patent No. 2,111,122 for printing the identification of the account on the check and register sheets. When the first name card is encountered, a group indicating cycle is being performed so that it is possible to print the account number which appears on all cards after the first check number card. Upon the appearance of the last address card, the change between this card and the first dividend card of the following group is detected and calls into play, devices for initiating line spacing operation for shifting both the check strip 5 and the register sheet 7 until the register sheet is in the proper block position after which the check is fed further by means of an ejection operation to carry the check sheet into a position wherein the following check form is ready to receive the second check number printing impression.

Before discussing the feeding and ejection of the sheets it is believed well to point out the performance of other functions which take place during check printing.

For example, certain of the address cards may be skipped or bypassed without causing printing or spacing. In accounts having both home and business address cards it may be desired to avoid printing the home address on the check. The address cards which are to be bypassed without causing printing or spacing are X punched in column 78. The upper brush UB, Fig. 17f, cooperating with this column is connected by a plug wire to socket 773, Fig. 17e, to energize the pickup coil of relay G4l. This relay then operates its holding coil which opens contacts G4lB, Fig. 17b to open the print clutch circuit previously traced through clutch magnet PCM, thus preventing printing on cycles involving cards punched with X holes in the 78th column.

As seen in Fig. 2, names and addresses are not printed as a heading, but instead, follow the numerical printing on the checks. The machine is set to tabulate the detail or dividend cards. Listing is effected for address printing after the total cycle and is initiated by X hole 758, as pointed out hereinbefore. Address cards are listed by plugging as heading cards from the X hole sensing brush UB to the "head card" socket 779, Fig. 17e. This makes the pickup coil of relay G5 effective to set up a circuit through its holding coil and contacts G5A, Fig. 17a to pick up relay G6. A relay G75 enables printing and disables ejection during regular card feeding as governed by card feed contacts CFCE2 (Fig. 17c). The circuit for relay G75 includes line 700, relay G75, contacts G48B, contacts CFCE2, wire 776 (Fig. 17f), wire 807, card lever contacts R3BL, wire 721, and line 701. The circuit for relay G6 is from line 701 through wire 702, cam contacts CFG1, contacts G5A, contacts G75A timed by relay G75 and cam contacts CFCE2 timed similar to contacts CF10 (Fig. 18), the pickup coil of relay G6 and wire 704' to line 700. Relay G6 then shifts contacts G6AL, Fig. 17b, to close the circuit to the print clutch magnet PCM to cause listing.

Item printing takes place under control of a circuit from lower brush LB (Fig. 17f), socket 724'', plug wire to socket 755' (Fig. 17g), normally closed contacts TSC, print magnet PM, wire 732, circuit breakers CF17, and line 700.

As seen in Fig. 3, certain of the items and totals are printed in two places, while others are represented only once. A set of printer controls operating on the right side of the record is common to control from three sources; it is plugged to the check number accumulator, the dividend amount accumulator, and the card sensing brushes cooperating with the account number perforations.

There are six accumulators used to control printing. The dividend amount accumulator is plugged to two printer banks in the left and right columns of the record, and it is also plugged to a grand total accumulator for controlling the printing of the grand total amount shown under the addresses. The share number accumulator is plugged to the printer bank in the third column and also to another grand totalizer. An impulse carrying accumulator is connected to the check number accumulator which is plugged to two printer banks for operating in the second and fourth columns on the record.

Check numbering

The wiring of the check number accumulator is arranged to enter a transfer impulse to the units wheel during each cycle that the accumulator is used for taking a reading of a check number.

The addition of a unit is brought about by adding 100 in a two position or double denomination accumulator on each cycle following a check ejecting cycle during which connections are set up to make the addition. Ejection occurs late in a cycle, early enough to control the addition of 10 but too early to control the addition of unity in the Hollerith system. The carry impulse flowing from this two position accumulator is directed into the check number accumulator which is thereby enabled to advance and print on the same cycle. To add 100, a plug wire is connected between add socket 725', Fig. 17g, leading from the tens order of an accumulator to socket 775, Fig. 17g, in series with the cam contacts CF27 which close at the "10" time in the cycle, thence through wire 776, and lower card lever relay contacts LCR1B, Fig. 17f, and wire 721 to the line 701. But before the addition is made effective, it is properly timed by connections for closing accumulator contacts R49L, Fig. 17g, only after the ejection of a check. During check ejection, the first pickup coil of relay G42, Fig. 17, is energized because it is in parallel with eject magnet EM. This relay then operates a holding coil (Fig. 17b) which closes contacts G42B, Fig. 17f, to make effective a circuit through line 701, wire 721, contacts LCR1B, contacts G42B, socket eject GI, plug wire to socket 777, Fig. 17d, relay R49, and through the cam contacts CF23 to line 700. Then relay R49 closes R49L, Fig. 17g, to direct the "10"

impulse into the tens order of the two position accumulator.

Of course, a carry impulse is initiated from the tens order of the accumulator and this is carried by plug connections over into the units order of the accumulator holding the check number. Referring to Fig. 17g, it is seen that a plug wire 778 connects between the carry contacts of one accumulator to the units order of the other accumulator. The accumulators are of the kind disclosed in Patent 2,079,418.

Accordingly, the wheels of the number accumulator are advanced one step during each check numbering operation. It may be explained that the check number accumulator is not reset except at the end of a series of operations as when all checks and the register sheet have been completed for a particular issue of stock. Switch SG3, Fig. 17b, is normally open to prevent operation of total switch plate magnet TSP7, and contacts TSB (Fig. 17g), but may be closed by the operator after all cards have been sensed relating to one issue of stock.

Line spacing control

During numeral printing and address listing, line spacing is performed in connection with each printing operation. The circuit for ordinary line spacing is as follows: line 700, Fig. 17, interlock contact 286, wires 816 and 780, both line space magnets LSM and ALSM, wire 781, contacts G15B closed by the holding coil of relay G15 on and after the check number printing cycle, cam contacts PM11, contacts M11 and line 701. Contacts 286 open to prevent line spacing during ejection.

Relay G15 pickup coil, Fig. 17f, is picked up cyclically, but the related holding circuit is made effective only on the check number printing cycle to prevent spacing before number printing. At about the middle of the cycle, contacts CF6, Fig. 17c, close to pick up a relay G67 by the circuit from line 701, wire 765, contacts CF6, wires 782 and 783, relay G67 and wire 784 to line 700. Relay G67 then closes contacts G67A, Fig. 17f, to prepare part of the connections including the pickup coil of relay G15 and contacts LCR3A. Relay LCR3 is picked up by operation of the lower card lever and closure of contacts LCLC, Fig. 17f. Relay G15 is held up until a heading skip or an ejection starts. The circuit through the holding coil is from line 700, Fig. 17, interlock contacts 286, the holding coil of relay G15, contacts G15AL, wire 786, contacts G43B, G2B and line 701. Printing of the first check number occurs on the second cycle, and relay G43 is provided to hold up closure of the circuit until the proper time. Relay G43 is a coil which is picked up through sensing of the perforation 736, Fig. 1, and energization of holding relay G42 and relay G43, Fig. 17b, as explained hereinbefore. The contacts G2B are picked up by the holding coil of relay G2 upon initiation of skipping to prevent spacing directly thereafter.

Skip initiation

The last address card 4', Fig. 1, of a group is distinguished from the following card 1' which is the first dividend card of the second group, by the X hole 758 in the 80th column, and it is this difference which is sensed to initiate skipping or repeated line spacing to shift the record sheets from one check and block space to the succeeding check and block space. The upper brush UB, Fig. 17f, of the 80th column which senses the X hole 758 is connected by a plug wire, to the "head card" plug socket 779, Fig. 17e, and the pickup coil of relay G5 is energized when M17 closes near the middle of the cycle at 189°. The pickup coil of relay G6, Fig. 17a, is then picked up by closure of contacts G5A and closure of contacts G75A at 238° by cam contacts CFCE2 similar to contacts CF10 (Fig. 18). Relay G6 is held up by the circuit through its holding coil, including wire 719 and contacts G6AU and CFG2 which holds until 216° of the next cycle which is the printing cycle of the last address card. Closure of contacts G6AU and cam contacts CFG3 energize the holding coil of relay G7 and the pickup coil of relay G8 through line 700, Fig. 17a, wire 704', relays G7 and G8, wire 787, cam contacts CFG3, wire 788, contacts G6AU, wires 719, 791, contacts CFG2 and wire 702 to line 701. At 249° of the cycle, during which relay G6 drops at 216°, contacts PMG4, Fig. 17a, close to energize relay G2 over a circuit including line 700, wire 704', pickup coil G2, contacts PMG4, points G7B now transferred, normally closed points G6B, wires 704 and 702 to line 701. Relay G2 then sets up a holding circuit for itself by the closure of contacts G2AU and current flows from line 700, wire 704', holding coil G2, contacts G2AU, contacts G10B, normally closed skip stopping contacts 498, wires 790, 791, cam contacts CFG2 and wire 702 to line 701. Another relay G3 is connected in parallel with the holding coil of relay G2 to provide other contacts with the same space skipping control as the G2 contacts. The holding coil of relay G2 then closes the normally open contacts G2B, Fig. 17, to close part of the circuit through the line space magnets, the circuit being completed as follows after printing is finished: line 700, interlock contacts 286, wires 816 and 780, line space magnets LSM, ALSM, sheet stop contacts 405, contacts PMG3 open during printing and closed thereafter, contacts G17B, G20B, G23BL, normally open contacts G2B and line 701. Line spacing then continues until either cam point 517 or 500, Fig. 8, strikes lever 513 to open contacts 498, Figs. 7 and 17a, and deenergize the holding coil of relay G2 and open contacts G2B. If less than 6 lines are printed, cam point 517 is effective to initiate check ejection, but on an overflow of 7-9 lines of print, point 500 comes into action at the 12th line to initiate check ejection. In either case, the register sheet then stands in position to receive a line of print at the top of a block while the check strip is advanced by ejection.

Skip stopping and check ejection

The number of line spaces skipped after the last address line is printed, is determined by the number of lines printed. The object of the skipping operation is to bring the register sheet to the first line position of an unused block space. To do this, skipping must terminate after causing either six or twelve spaces per check. If skipping starts before the sixth line of the check, it stops after the sixth spacing operation because at that time, cam lever 517, Fig. 7, strikes point 515 and rocks lever 513, releasing crank 512 and opening contacts 498 to break the skipping circuit. At the same time, contacts 292 are closed to initiate ejection. Since some checks require 7, 8, or 9 lines of print, the auxiliary stop point 500 is provided also to rock lever 513 and open contacts 498 after the twelfth line of spacing for such overflow checks, so that two full 6-line blocks of the register sheet will be used. The recording of the following check data will then be started on the register sheet in the first line position of a new block.

Upon termination of skipping, the register sheet remains positioned, but the check strip must be shifted further because the few lines of skipping are not enough to move the strip from check to check. Therefore, an ejection operation is initiated. Heretofore, operation of the automatic carriage called for auto start of the tabulator after skipping, but in the present case, ejection of the check takes place before printing starts. Switch SG6, Fig. 17a, is thrown to the "eject" position in which the skip auto start contacts 292 are transferred away from the auto start interlock relay G22 to the check eject relay G36. On the change from address to dividend card the relay G6 effects a change in relay G37 which in turn, calls into play relay G36. The circuit through relay G37, Fig. 17b, includes line 701, contacts LCR1C, closed contacts G6AL, wire 794, relay G37, and wire 712 to line 700. Relay G37, Fig. 17a, then closes contacts G37A and a circuit is completed through the pickup coil of relay G36 as follows: line 701, wire 702, contacts CFG2, wires 791, 790, skip contacts 292 closed after 6 or 12 lines, normally closed contacts G24B. switch SG6. contacts G37A, switch SG9, relay G36 pickup coil. wire 704' and line 700. Closure of contacts G36AL (Fig. 17) sets up the holding circuit. line 700. wire 795, contacts 286, wire 816, the holding coil of relay G36, contacts G36AL and wire 836 to line 701.

The contacts G36AU, Fig. 17, when operated by the holding coil of relay G36, then close the circuit through eject magnet EM as follows: line 700, wires 795, 796. magnet EM, wire 797. contacts G64B. contacts G36AU, and wire 798 to line 701. Magnet EM then calls into action the mechanism of Fig. 9 to move the check strip in long feeding to an extent determined by the setting of lever 266, Fig. 7. shown to complete a feed of 3½ inches for the width of a check. Ejection is followed by the automatic start of card feeding due to the closure of contacts 291, Fig. 17a and the establishment of the circuit from line 701, wire 702, cam contacts CFG2, wire 791. wire 790, contacts 291, normally closed contacts G3A, the pickup coil of relay G22, and wire 704' to line 700. The holding coil of relay G22 is energized by a circuit: line 700, wire 704', holding coil G22, contacts G22AL, wire 791, contacts CFG2, and wire 702 to line 701. The holding coil of relay G22 then closes contacts G22AU, Fig. 17a, to make effective the second pickup coil of relay G1 over a circuit including line 701, wire 702. cam contacts CBG1, wire 799, contacts G22AU, relay G1 and wire 704' to line 700. The holding coil of relay G1 is held through the closure of its contacts G1AL and then its other contacts G1B in series with the card feed clutch magnet CFC control for an auto start operation.

At the same time that the holding coil of relay G1 serves to start card feeding, other of its contacts G1AU. Fig. 17b, are closed to start a printing operation automatically after ejection.

In order to print the check number on the second and all succeeding checks, the pickup coil G42, Fig. 17, in parallel with the eject magnet EM, is used to connect the accumulator holding the serially advanced check number to the printing magnets PM. This is similar to number printing initiation by relay G42 in connection with the first cycle in which printing was operated under control of perforation 736, Fig. 1, as explained hereinbefore.

After printing the check number on the second check, the operations carry on as with the first check, the dividend checks being tabulated and the totals printed before name and address printing takes place.

Account number control

As shown in Fig. 1, the name and address cards of the groups are distinguished from the dividend cards of the same groups by means of special perforations 758. There is a further distinction in that the cards are all perforated with account number representations 758', each group of related dividend and address cards having the same account number perforations. Therefore, the lines of printing impressions placed on a single check should be related, in that the dividend amounts written on the check should relate to the same account as the address cards effecting the alphabetic printing on the check. If the cards of one group are disarranged by having dividend cards interspersed between address cards, this fact would be detected through sensing of the special perforations 758. However, in the event that cards of other accounts should be mixed with either the dividend cards or the address cards, such an error could not be detected through sensing of the special perforations 758. It is for this reason that the account number control is provided to detect differences in account numbers occurring either at a point within a series of successive dividend or address cards, or between successive dividend and address cards.

From the foregoing, it is clear that errors may occur in any of three different ways. Dividend cards of different accounts may be together; dividend cards of one account may be followed by address cards of another account; or address cards of different accounts may be mixed together.

When an error in the order of the cards is detected, the machine is not stopped, but a change in the appearance of the checks is effected so that it is apparent that an error is present. For example, when dividend cards of unrelated accounts are together, as soon as the error is detected, the machine effects a total taking operation followed by a skipping operation, which leaves the check without name and address heading identification. The same type of operation occurs when dividend cards of one account are followed by address cards of another account. Should the break in account number control take place during address printing, a skipping operation is initiated to leave the check with an incomplete identification which is easily detected after removal of the check strip from the machine.

The change in account numbers between the various groups of cards is detected by sensing succeeding cards under the upper and lower brushes as in the usual group control device. When the sensing of different group number perforations coincides with the change from address cards of one account to dividend cards of a following account there is no special control of the machine because the cards are supposed to follow in that order, and the change coincides with the change from X to no-X control as determined by the special perforations 758. Both of the changes exercise their influence through the minor control, but the account number change causes space skipping as well as total taking.

Referring to Fig. 17f, it is noted that pickup coils of pairs of relays R129' and R130' (but one pair of which is shown) are connected to lower and upper brushes respectively in the columns where the account number perforations are found in the cards. These relays function to detect differences in account numbers between cards under the upper and lower brushes in the same fashion as the ordinary group control relays R129 and R130 the circuits for which have been traced hereinbefore. The holding coils of relays R129' and R130', Fig. 17c, effect the displacement of contacts R129C and R130C to set up connections for directing a control impulse through total taking and skipping controls whenever a change in account numbers is detected. The control circuit may be traced starting from line 701, Fig. 17c, through wire 765, circuit breaker contacts CB18 and CB17, wire 802, thence through either of the two contacts R130C or R129C when shifted alone, over to plug 800 and through a plug wire to socket 801, Fig. 17e, through lower card lever contact LCR3C, the pickup coil of relay G20 and wire 803 to line 700.

Should the change in account number be detected while dividend cards are being analyzed, connections are set up to induce a minor control change to effect total printing before skipping operation. The holding coil of relay G20 acts to close contacts G20AL, Fig. 17e, to energize another control relay G48 which is energized by a circuit including line 700, wire 803, relay G48, switch SG12, contacts G20AL, wire 804, Fig. 17c, wire 805, contacts CB24 and line 701.

Relay G48 acts to close its associated contacts G48A, Fig. 17e, which are in series with the pickup coil of minor control relay R26. A circuit is set up and may be followed through line 700, wire 740, cam contacts CB19, pickup coil of relay R26, the minor control switch S4, contacts G48A, contacts G70A, cam contacts CF1. normally closed contacts G8B, wire 806, wire 776, Fig. 17f, wire 807, contacts LCR1B and wire 721 to line 701. Relay G48 also opens contacts G48B (Fig. 17c) to break the circuit through relay G75 which then opens contacts G75A to prevent listing.

Should the operation of relay G48 in closing contacts G48A, coincide with the sensing of heading or address cards, then it is desired that no actuation of the pickup coil of minor relay R26 take place. This last mentioned control is brought about by the presence of contacts G70A in series with contacts G48A, and the former are opened before the latter close, in order to prevent energization of the pickup coil of relay R26 when an account number change occurs during address printing. Operation of contacts G70A is effected by relay G70, Fig. 17b, which is made effective by means of a circuit including the holding coil of relay G8 connected in parallel with relay G70. As pointed out hereinbefore, the pickup coil of relay G8, Fig. 17a, is energized the same time that the holding coil of G7 is made effective through a train of connections set up by the sensing of an X perforation in each name and address card. The circuit through relay G70 is found shown in Fig. 17b, where it is seen to flow from line 700, through relay G70, contacts G8AU, wire 741. cam contacts CF22, and wires 742, 717, to line 701.

When a change in account number is detected between the last dividend card and the first name card of the same group, the holding coil of relay G20, Fig. 17e, mentioned hereinbefore, operates contacts G20AU, Fig. 17a, to initiate a skip feeding operation which serves to space the check strip so that it is ejected without receiving name and address impressions. Relay G20 conditions a circuit for the energization of the pickup coil of skip relay G2 by means of the circuit from line 700, Fig. 17a, wire 704', relay G2 pickup coil, wire 809, switch SG13, contacts G20AU, wire 808, switch SG2, Fig. 17e, wire 806, wire 776, wire 807, Fig. 17f, contacts LCR1B and wire 721 to line 701. When the pickup coil of relay G2 is thus made effective, its holding coil transfers contacts G2B, Fig. 17, and sets up a circuit for energizing both line spacing magnets LSM and ALSM, as traced hereinbefore.

Contacts G2B are also shifted under the conditions prevailing when a change in account number is sensed while dividend cards are being fed through the machine, but at this time the operation of skipping is suspended until the total amount of the dividends is printed. The holding coil of relay G23, Fig. 17, opens contacts G23BL in series with contacts G2B and the line spacing magnets to prevent spacing until after the total is printed. The pickup coil of relay G23 is made effective upon initiation of a total cycle because at the time operation of minor control magnet R26 is initiated, the related contacts R26B, Fig. 17c, are closed in series with the pickup coil of relay G23. The circuit through the pickup part of relay G23 may be followed from line 700 through wire 784, relay G23 pickup coil, contacts R26B, wire 810, through cam contacts PM15, wire 811, wire 765 and line 701. Thus, contacts G23BL, Fig. 17, are held open to prevent initiation of skipping until total printing is completed. Relay G48, in addition to exercising control for initiating total taking operations on changes in account numbers by the closure of contacts G48A, Fig. 17e, also effects control to permit ejection of a check before all the address cards of a group are recorded thereon, due to a change in account number among the address cards of the same group. To perform the second mentioned function, relay G48, Fig. 17e, is provided with another pair of contacts G48B, Fig. 17c, which are opened in series with relay G75 to disable this relay which then fails to close contacts G75A in series with the pickup coil of relay G6, Fig. 17a, provided for the purpose of normally preventing ejection until all address cards have been considered. The control by relay G6 may be traced still further by noting that through its holding coil it operates contacts G6AL, Fig. 17b, to control the operation of another relay G37 which in turn controls the pickup coil of relay G36, Fig. 17a, which has contacts in series with the eject control magnet EM, Fig. 17.

Block printing

The register sheet 7, Fig. 3, is divided into forms; and each form is sub-divided into 22 block spaces, each space being of a width suited to receive six lines of printing impressions. The object is to provide separate spaces for twenty different check recordings in addition to the heading space and space near the bottom of the sheet for reception of a progressive total impression provided for checking purposes as the total of all the check amounts recorded on the preceding forms. Although most of the printed information on the checks will be found to fall within the one inch block space provided on a register sheet, there will be cases where the names and addresses will run to more than four lines, and in such cases, room must be provided for seven, eight, or nine lines of recording. Then an overflow condition exists because the impressions relating to one check cover a space greater than that of one block and, as explained hereinbefore, the unused part of the second block is skipped to bring the first line of the third block in position to receive the first line of recording related to another account.

Normally, the 20th block is the last one to receive the impressions relating to an account, and whenever the lines of print fall within block 20, the progressive total is printed at the top of block 21 and the register sheet is fed to skip the rest of block 21 and also skips block 22 bearing the heading of the form. Two other conditions are liable to prevail when the register sheet is fed past the printer and the printing line approaches near the end of the form. Under one set of conditions, the recording of data in block 20 is found to overflow into block 21 and under such conditions the progressive total is eliminated and the register sheet is shifted to receive further printing impressions starting at the top of block 1 of the following form. The third condition involves an overflow of items from the 19th block into the 20th block and then it is required that the total be printed at the top of the 21st block and an extra degree of feed must be provided to carry the register sheet from the beginning of the 19th block past the 20th, 21st, and 22nd block and bring it up to the first line of the 1st block on the following form.

The control for governing block spacing is provided in the form of two stepping or counting switches and relays for counting the number of blocks used and then bringing into play, special controls associated with the several final positions of the register sheet as it presents the last few blocks of each form at the printing position. Special circuits are provided in connection with the sheet positions at the 20th, 21st and 22nd blocks. Another step switch is provided to count 6 extra lines of spacing when an overflow condition presents itself in the 19th block, necessitating jumping from one form to the other from the beginning of the 19th block rather than from the start of the 20th block.

There are two sets of block counting contacts 382 and 382' separately shown in switches #1 and #2 in Fig. 17a, but operated by the same switch spacing magnet SSM. There are also two sets of line counting contacts 382a and 382b, the former shown in switch #1 (Fig. 17) and the latter in switch #2 (Fig. 17a), but both sets are contacted by levers operated under control of the same switch spacing magnet SSM'.

Considering first the ordinary condition wherein the 20th block presents itself and the lines of data are found to be six or less in number, and therefore confined within the 20th block. Under such conditions it is desired that the completion of printing in the 20th block, set up circuits for initiating a progressive total and for feeding the register sheet from form to form. Before considering the conditions prevailing when the 20th block is reached, it is believed well to outline the operation of the block counting switch for determining when the 20th block is reached. Referring to Fig. 7 it is seen that contacts 292 are closed by cam points 517 or 500 whenever six or twelve lines of spacing have passed on the register sheet. Six lines of space are equivalent to a distance of travel of one inch, which is the space allotted for each block. When contact 292 closes it initiates energization of the stepping switch magnet SSM, Fig. 15, for advancing the commutator lever 386 one step. Turning to Fig. 17a, the circuit through magnet SSM may be traced from line 700 through wire 704', magnet SSM, wires 812, 813, and 814, switch SG6, normally closed points G24B, contacts 292, wire 790, wire 791, cam contacts CFG2 and wire 702 to line 701. The energization of magnet SSM is repeated as the succeeding blocks on the register sheet pass the printing position until the register sheet is brought into the position presenting the 20th block, and at that time, commutator lever 386, Fig. 17a, makes contact with the segment 382', found in the 20th position of the semi-circular arrangement of segments on the block count switch #2. An impulse is directed through this 20th segment 382' and a relay G33 for setting up controls to provide total taking and skipping operations as an incident to the appearance of the end of the form on the register sheet. The circuit through relay G33 includes line 701, wire 702, lever 386 in block counting switch #2, segment 382' in the 20th position, wire 815, relay G33, wire 704' and line 700. Associated with relay G33 are a pair of contacts, one of which is provided to prevent ejection operation until a total is printed and the register sheet is spaced from form to form, and the other contact sets up circuits for initiating a total taking cycle to print a progressive total near the end of the form.

The first mentioned contacts G33A, Fig. 17, are closed to provide a circuit for a relay G64 as follows: Line 701, wire 770, contacts G33A, relay G64, wire 816, interlock contacts 285 and wire 795 to line 700. Relay G64 then opens contacts G64B, breaking the circuit through the eject magnet EM and preventing check ejection until the printing and skipping operations have been completed.

The other contacts G33B, Fig. 17, are closed in series with the pickup coil of a relay G38 to initiate total taking. Also in series with the pickup part of relay G38 are the contacts G36AU for insuring that total printing is suspended until after the operations of recording the address on check and skipping from block to block have been completed. The complete circuit through the pickup coil of relay G38 includes line 700, wire 795, relay G38 pickup coil, contacts G33B, contacts G36AU and wire 798 to line 701. The holding coil of energized relay G38 (Fig. 17c) is then effective to close contacts G38BU, Fig. 17e, to call into operation the pickup coil of intermediate total relay R27 by the circuit through line 701, contacts G38BU, wire 817, switch S5, pickup part of relay R27, cam contacts CB19, wire 740 and line 700. The holding coil of relay R27 (Fig. 17c), and magnet INT then serve to make the usual connections to the accumulator contacts INT2U (Fig. 17b) for energizing the total switch plate magnets TSP7, TSP8 and TSP16 to close contacts TSA, TSB, and TSC (Fig. 17g) to connect the orders of the accumulator holding the total amount of the dividends added up to the point of taking the total. The switch magnet circuit is from line 700, through wire 712, wire 712a, switch magnets TSP7, TSP8, etc., contacts MI3, INT2u, wire 714, switch S9, contacts MA2, wires 715, 716, relay contacts G66B, cam contacts CB21, wire 717, and line 701.

The total printing circuit is from line 701 (Fig. 17g), contacts CB11 and CB16, wire 263S, accumulator transfer contacts 87S, cable 306S, plug wire 307S, lower contacts TSC, print magnet PM, wire 732, the circuit breaker contacts, and line 700. The total impression is made in the first line of the 21st block as seen in Fig. 3. The progressive total is printed on the lower right end of the stub 6, Fig. 2, of a check as it is duplicated on the register sheet. After the total is printed and cam contacts PMG4 close, the skipping operation is initiated through a circuit including contacts G38AU, Fig. 17a, and the second pickup coil of relay G7. The circuit is from line 700 through wire 704', the pickup coil of relay G7, contacts G38AU and wire 818 to wire 702 connected to line 701. Then the holding coil of relay G7 shifts contacts G7B, Fig. 17a, to call into operation the pickup coil of relay G2 for initiating line spacing operation. The circuit through the pickup coil of relay G2 may be traced through line 700, wire 704', relay G2 pickup coil, cam contacts PMG4, normally open contacts G7B, normally closed contacts G6B and wires 704 and 702 to line 701. The holding coil of the relay G2 then operates contacts G2B, Fig. 17, to complete a circuit to both line spacing magnets as pointed out hereinbefore.

Ordinarily, skipping is stopped after twelve lines have passed but, in the present instance, it is desired to go beyond the 22nd block and carry the register sheet into a starting position, presenting the first block of a new form. Therefore, provisions are made to prevent the stopping action which usually takes place when contacts 498, Figs. 7 and 17a, open, due to the actuation of auxiliary cam point 500. Coinciding with the skipping of the register sheet from the 20th into the 21st block, there occurs the closure of contacts 292, due to the operation of cam point 517. This causes another energization of the stepping control magnet SSM, Fig. 17a, which then serves the shift commutator lever 386 from the 20th to the 21st segment 382' in line with relay G34, provided to maintain skipping by shunting contacts 498 to maintain the line spacing magnets in operation. The circuit through relay G34 includes line 700, wire 704', relay G34, wire 819, the 21st segment 382', lever 386 and wire 702 to line 701. Referring to the top of Fig. 17a, it is seen that when contacts 498 open, there is usually a disablement of the holding coil of relay G2, which in turn stops operation of the line spacing magnets in series with contacts controlled thereby. However, contacts G34A are operated to be closed and thereby complete a shunt connection around contacts 498 to maintain skipping operation after the 21st block, even though contacts 498 open at the time.

At the same time that contacts 498, Fig. 7, are open by the operation of cam point 500, as the register sheet passes between the 21st and 22nd block, the other contacts 292 are again closed, and another impulse is directed through the stepping switch magnet SSM, Fig. 17a. This serves to bring into play a relay G35 connected to the 22nd segment 382', found on the block count switch #2. The circuit through relay G35 flows from line 700 through wire 704', relay G35, wire 820, segment 382' in the 22nd position, lever 386 and wire 702 to line 701. The skipping continues through the 22nd block until the end of it is reached at which time cam point 274, Fig. 7, operates to open contacts 405 and close contacts 269. Contacts 405, Fig. 17, are in series with the line spacing magnets ALSM and LSM, and therefore the operation of these contacts serves to stop the skipping operation and hold the register sheet in the position ready to receive printing impressions on a new form. The other contacts 269, Fig. 17, are in series with relays G9 and G10; the former being provided to insure a check ejection operation, and the latter serving to hold up the card feed until the record sheets are ready to receive printing impressions. The circuit through relays G9 and G10 includes line 700, wire 795, contacts 286, wire 816, the relays G9 and G10, normally closed contacts G17AL, contacts 269, PMG2, switch SG7, wire 824, normally closed contacts G63B, contacts M17 and INT7, wire 825, and line 701.

At the top of Fig. 17 it is seen that relay G9 closes contacts G9AL to prepare part of the circuit through the eject magnet EM, which circuit also involves contacts G35B operated by relay G35 as the register sheet is brought into the 22nd block position, as mentioned hereinbefore. The check ejecting circuit includes wire 700, wires 795, 796, magnet EM, contacts G35B, contacts G9AL, wire 821, and line 701. At the end of the check ejection operation, contacts 291, Fig. 17a, are closed and the pickup coil of a relay G22 is operated, and it, in turn, causes operation of relay G1 for automatic starting of card feeding and printing operation.

Since the block counting switch is provided with more than 22 segment positions, it is necessary to advance it to bring the lever 386 thereon, around further into the start position before printing on a new form. This is done by means of successive energizations of the step switch magnet SSM through relay connections made when contacts 269, Fig. 7, are closed by cam point 274, as the register sheet goes into the 22nd block position. Referring to Fig. 17, it is seen that when contacts G35A are closed, the pickup coil of a relay G39 is arranged in parallel with the other relays G9 and G10, referred to hereinbefore as connected in series with contacts 269. The circuit through the pickup coil of relay G39 may be traced from line 700, through interlock contacts 286, wire 816, relay G39 pickup coil, wire 822, contacts G35A, normally closed contacts G34B, wire 823, normally closed contacts G17AL, contacts 269, cam contacts PMG2, switch SG7, wire 824, normally closed contacts G63B, normally closed total control contacts M17 and INT 7, and wire 825 to line 701. The holding circuit for relay G39 includes line 700, wire 795, holding coil of G39, contacts G39AL, contacts G32A, and wire 798 to line 701. The holding coil of relay G39 closes contacts G39BU, Fig. 17a, to complete a circuit through the counting switch magnet SSM as follows: Line 700, wire 704', magnet SSM, wire 827, interrupter contacts 393, segments 382, lever 386, wire 828, contacts G39BU, wires 790 and 791, cam contacts CFG2 and wire 702 to line 701. This circuit is successively closed and opened by alternating operation of magnet SSM and opening of contacts 393 as an incident to stepping operation of the commutator levers 386. Operation continues until the lever 386 is brought to the home position shown wherein it is shifted out of cooperation with the segments 382 connected in series with the stepping magnet SSM.

When the register sheet is left in an intermediate block position, at the middle of a form, at the end of a run of cards, it is desirable that manual control be provided to restore the block counting switch to the normal position. This is done by operating a switch SG8, Fig. 17, to complete a circuit to the pickup coil of relay G39 as follows: line 700, contacts 286, wire 816, relay G39 pickup coil, wire 822, switch SG8, and wire 798 to line 701.

As the block counting switch is brought to the home position, the holding coil of relay G39 is made inoperative, to prevent successive stepping and resetting which would otherwise follow directly after the first stepping operation. The holding coil of relay G39 is in series with a pair of contacts G32A, Fig. 17, controlled by relay G32, in series with the segment 382', Fig. 17a, in the home position of the block counting switch. The circuit for relay G32 includes the line 700, wire 704', relay G32, contacts G30B, segment 382', in the first position, lever 386, and wire 702 to line 701. Relay G30 closes contacts G30B and is normally energized by a circuit running through connections established when the line counting switch #2 is in the home position. The circuit through relay G30 may be traced from line 700, through wire 704', relay G30, wire 830, segment 382b in the first position, lever 386 and wire 702 to line 701.

As shown in Fig. 3, there are times when an overflow condition is encountered as block number 20 is in the printing position. In such instances, the printing of a progressive total is omitted because the space allotted for it is taken up by a line of address print. Ordinarily, the holding coil of relay G36, Fig. 17, closes contacts G36AU at the same time as relay G33, Fig. 17a, closes contacts G33B, Fig. 17, due to the presence of the 20th block and the completion of address printing within that block, thereby energizing the pickup coil of relay G38 for the initiation of the progressive total. When more than four address cards are found in the account associated with the 20th block, the X perforations in those cards, suspend the energization of relay G36 and closure of contacts G36AU until relay G33 is no longer effective to induce the total taking operation.

When an overflow condition is encountered in block 19, as shown at the top of Fig. 3, the remainder of block 20 is skipped to place the total impression in the usual position at the top of block 21. The relation between the position of the register sheet and the cam points of the automatic carriage, Fig. 7, is then changed from the relationship discussed hereinbefore, when operations associated with the end of a form started with the beginning of the 20th block, rather than the beginning of the 19th block. All the sheet spacing controls lag behind an extent equivalent to the space of one block and therefore necessitate operations for producing six additional lines of spacing.

As the register sheet passes from block 19 into block 20, cam points 517 Fig. 7, operate in the usual way, to close contacts 292, but this operation does not effect any control, because at the same time, X punched address cards continue to feed and call for a continuation of printing operation. As soon as the last address card appears, the change from X to no-X is deteced by the upper brush plugged to the heading control socket 779, Fig. 17e, in series with the pickup coil of relay G5. Then card feeding is stopped and a skipping operation is initiated by successive operation of relays G5, G6, G7 and G2, the latter having contacts in series with the line spacing magnets to cause successive energizations thereof, as explained hereinbefore under "Skip initiation."

Skipping continues from the middle of the 20th block until the end of the block is reached at which time, auxiliary cam points 500, Fig. 7, operate to again close contacts 292 which, in turn, serve to energize the pickup coil of relay G36 (Fig. 17a). Associated with contacts G36AU, Fig. 17, operated by the holding coil of relay G36 are contacts G33B of relay G33 (effective in block 20) for energizing the pickup coil of relay G38, which in turn calls into operation the pickup coil of relay R27 (Fig. 17e) to initiate an intermediate or progressive total. After the total is printed at the top of block 21, skipping is resumed by the closure of contacts G38AU, Fig. 17a, since they pick up the second pickup coil of relay G7 and later through contacts G7B make relay G2 effective to close the line spacing circuit. Then, skipping continues until the 18th line is reached at which time, cam point 274, Fig. 7, operates to open contacts 405, Fig. 17, which are in series with the line spacing magnets. At the same time, contacts 269 close to connect part of the circuit usually effective to pick up relay G9, but at this time the relay is not effective to cause ejection, because contacts G35B remain opened in line with eject magnet EM, due to the register sheet being in the 21st block position as indicated on the block counting switch 2, Fig. 17a.

Instead of relay G35 being effective at the end of the skipping operations, relay G34 is effective because lever 386 of block switch 2, is adjusted to the 21st position. Relay G34 is then used to pick up controls for continuing the feeding operation. It closes contacts G34B, Fig. 17, in series with a relay G40 and a circuit is established which may be traced from line 700, through interlock contacts 286, wire 816, relay G40, cam contacts CBG2, operated contacts G34B, wire 823, contacts G17AL, overflow contacts 269, cam contacts PMG2, switch SG7, wire 824, contacts G63B, total control contacts MI7, INT7, and wire 825 to line 701. Relay G40 sets up its own holding circuit by closure of contacts G40AL arranged in shunt around cam contacts CBG2.

Relay G40 effects closure of two pairs of contacts, one of which is used to call in successive operation of the line space magnets, and the other is used to operate the line count step switch in synchronism with line spacing so that the number of line spaces may be counted to limit the feeding operation to six line spaces which is enough to carry it from the 22nd block to the starting position at the top of first block on the following form of the register sheet. The one contact G40AU, Fig. 17, is in series with the line spacing magnets and constantly running cam contacts CBG3 and CBG4, operating to control spacing at doubled speed by sending two successive impulses per cycle through the line spacing magnets. The circuit through the line spacing magnets follows a path from line 701, through wire 833, thence through cam contacts CBG3 and CBG4, operated alternately to close a circuit after 183° of operation, then continues through contacts G40AU, wire 781, magnets LSM, ALSM, wire 780, contacts 286 and wire 795, to line 700. At the same time, contacts G40BL are closed to connect the constantly running cam contacts to the magnet SSM', controlling operation of the line counting switch. The line count switch is constructed and operated by magnet SSM' in the same manner as the block count switch operated by magnet SSM. The circuit for advancing the line counting switch may be traced from line 701 through wire 833, cam contacts CBG3, CBG4, contacts G40BL, wire 834, magnet SSM', wire 816, contacts 286, wire 795, to line 700. Every time magnet SSM' is energized, it operates the mechanical connections of the line counting switch to rotate the lever 386 associated with line count switch #2, Fig. 17a, to rotate it clock-wise along the segments 382b until the sixth segment is reached, at which time a circuit is established through a relay G31, terminating the line spacing operation. The circuit through relay G31 includes line 701, Fig. 17a, wire 702, lever 386 of line count switch #2, the sixth segment 382b, wire 835, relay G31, wire 704' and line 700. Relay G31 then closes contacts G31B to send an impulse through the block counting control magnet SSM to space it from the 21st to the 22nd position, at which point it is shifted to deenergize relay G34 in series with segment 382' of the 21st position; and relay G35 is energized because it is connected to the block counting segment in the 22nd position. Relay G35 then serves to close associated contacts G35B, Fig. 17, in series with the eject magnet EM which is operated to eject a check form and restore the automatic carriage controls ready for operation in connection with a new check and new form on the register sheet.

Relay G35 also operates contacts G35A, Fig. 17, in series with the pickup coil of resetting relay G39, the operation of which has been described. However, the holding coil of relay G39 closes contacts G39AU which make an effective circuit through the line switch magnet SSM' at this time, because the armature lever 386 of the switch is displaced from the home position, into the sixth position wherein it completes the circuit through the segments 382a and magnet SSM'. Successive impulses are directed through the line count switch magnet by means of the circuit from line 701, through wire 836, contacts G39AU, wire 837, lever 386, segments 382a, wire 838, interrupter contacts 393a, relay SSM', contacts 286 and wire 795 to line 700. The stepping operation continues until the lever 386 is brought around to the normal position wherein it is moved away from segments 382a.

At the end of each check ejection cycle, contacts 291, Fig. 7, are closed in series with the pickup coil of relay G22, Fig. 17a, to initiate an automatic re-start operation to call into operation, feeding of the record cards and printing therefrom on the check and register sheet after the check number is printed from the storage accumulator.

While there has been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a record controlled machine for printing and feeding a continuous check strip and a duplicate register sheet, said strip being divided into check forms and said sheet being divided into long forms, each long form being sub-divided into blocks for receiving data relating to one check, said records comprising groups of related dividend, name and address records arranged with the dividend records in front of the address records and both having similar account number indicia, said dividend records bearing share number and dividend amount indicia, said name and address records bearing indicia representing alphabetic identification for the checks, said name and address records being distinguished from the dividend records by special indicia, means for feeding said records in succession, means for sensing the indicia on the records, means for sensing the special indicia on the address records for detecting a change from dividend records to address records or vice versa, devices under control of said sensing means for printing the number of shares and dividend amounts, means under control of said sensing means for printing on the strip and sheet the name and address data sensed on the records, a pair of feeding means, one for the check strip and one for the register sheet, a pair of line spacing devices cooperating separately with the strip and sheet feeding means and operated for every printing operation, means under control of said special sensing means for initiating operation of said line spacing devices after the printing of the last address line for skipping the register sheet from one block space into another block space, a pair of skip stopping devices cooperating with said line spacing devices and advanced thereby, one of which is effective to stop skipping after the passage of one block space when the related check data is printed within one block space and the other of which is effective upon the overflow of the printed data into the second block space for terminating skipping when the top of the third block space reaches printing position, means cooperating with said strip feeding means for ejecting said strip from check to check, means under control of said skip stopping means for initiating operation of said ejecting means, means for sensing the account number indicia, means under control of said account number sensing means for initiating operation of said line spacing means and producing a skipping operation when it is found that name and address cards of the same group relate to different accounts, means for counting the number of blocks spaced on said register sheet, means under control of said skip stopping means for advancing said block counting means, devices associated with said block counting means and made effective successively when the register sheet is positioned in the last three block positions of a register form, means under control of the device made effective when the sheet reaches the third block position from the end, for initiating operation of said printing devices, means under control of said printing devices and the device made effective when the sheet is in the second block position from the end for initiating skipping operation, means under control of the device made effective in the last block position for initiating operation of the ejecting means and restarting of the record feeding means, means under control of said device effective in the second block position from the end and said special indicia sensing means for disabling said printing devices when there is an overflow of data from said third to said second block space, means for counting a number of lines equivalent to one block space, means for operating said line counting means in synchronism with the operation of the line spacing means, means under control of the device made effective in said third block position and said means for sensing special indicia for calling into operation said line spacing means and said line count operating means when an overflow condition exists from the fourth block into the third block from the end and means cooperating with said line counting means, and rendered effective as the register sheet is carried to the top of the first block on a new form, for terminating the spacing operation.

2. In a record controlled machine for printing groups of data on a sheet, said records being divided into groups of related accounts and said sheet being divided into block spaces each proportioned to receive six lines of data relating to one account, means for sensing indicia on said records, means under control of said sensing means for printing on said sheet, a feeding means for said sheet, line spacing devices cooperating with said feeding means for feeding the sheet for every printing operation, means for detecting the end of records associated with one account, means under control of said detecting means for initiating successive operations of said line spacing devices, a pair of settable line spacing stops advanced by said line spacing devices, and spacing limiting means cooperating with said stops and controlling said spacing devices, whereby one of the stops is effective to stop spacing after six lines have passed, when spacing is initiated before seven lines of printing have been effected, and the other stop is effective to stop spacing after twelve lines of spacing have been covered, after an overflow of more than six lines into the second block.

3. In a record controlled machine for printing groups of data on a check strip and a register sheet, said records being divided into groups of related accounts and said register sheet being divided into block spaces each proportioned to receive six lines of data relating to one account, said check strip being divided into check forms, means for sensing indicia on said records, means under control of said sensing means for printing on said strip and said sheet, a pair of feeding means, one for the strip and one for the sheet, a pair of line spacing devices cooperating separately with the two feeding means for feeding the strip and sheet for every printing operation, means for detecting the end of records associated with one account, means under control of said detecting means for initiating operation of said line spacing devices, spacing limiting means for controlling said line spacing devices, and including a pair of settable line spacing stops advanced by said line spacing devices, one of which is effective to stop spacing at six lines when spacing is initiated before seven lines of printing have been effected and the other of which is effective to stop spacing after twelve lines of spacing have been covered after an overflow of more than six lines into the second block, means for controlling the strip feeding means for ejecting said check strip from form to form, and means under control of said detecting means and said line space limiting and stopping means for initiating operation of said ejecting means after block spacing is terminated.

4. In a record controlled machine for printing data on a sheet, said records being divided into groups and said sheet being divided into block spaces, each block designed to hold the data relating to one group, means for sensing indicia on said records, means under control of said sensing means for printing on said sheet, a sheet feed means, line spacing means cooperating with said feed means for feeding the sheet for every printing operation, means for initiating successive operations of said line spacing means to skip the unprinted portion of a block, means advanced by said spacing means for stopping said spacing means after the passage of the sheet from block to block, a step switch, means under control of said stopping means for operating said switch to move it in synchronism with the movement of the sheet from block to block and thereby count said blocks, means for suspending operation of said record sensing means, means for restoring said step switch, means under control of said switch when it has counted a certain number of blocks for initiating operation of said printing means, means under control of said switch when it has counted a larger number of blocks for preventing operation of said space stopping means to maintain feeding to the end of the sheet, and means under control of said switch when it has counted a still larger number of blocks for initiating operation of said switch restoring means to restore the switch and for controlling said suspending means to restart record sensing, whereby at the end of one sheet of block spaces preparations are made for another sheet of block spaces.

5. In a record controlled machine for printing data on a register sheet and a check strip, said records being divided into groups and said sheet being divided into block spaces, each block designed to hold the data relating to one group, a plurality of blocks making a register form, said check strip being divided into check forms, means for sensing indicia on said records, means under control of said sensing means for printing on said sheet and said strip, a pair of feeding means, one for the strip and one for the sheet, a pair of line spacing means cooperating separately with said feeding means for feeding the sheet and strip for every printing operation, long feeding means cooperating with said strip feeding means for ejecting the check forms, group control devices for sensing changes in record groups, means under control of said group control devices for initiating operation of said line spacing means to skip the unprinted portion of a block, means advanced by said spacing means for stopping said spacing means after the passage of the sheet from block to block, a block counting step switch, means under control of said stopping means for operating said switch to move it in synchronism with the movement of the sheet from block to block, means for restoring said switch, and a series of machine control devices controlled by said step switch and made effective in connection with the appearance of the sheet in the last three block printing positions, one of said machine control devices controlling said printing and long feeding means for initiating amount printing and preventing check ejection until the amount is printed on a check form, a second of said machine control devices controlling said sheet spacing means and said stopping means for preventing stopping of skipping and maintaining feeding to the end of the register form, and a third of said machine control devices controlling said long feeding means, the sensing means and the restoring means for initiating check ejection, record sensing and step switch restoration.

6. In a machine for printing groups of associated item lines on a sheet and spacing the sheet so that the first item lines of the groups are placed at regular intervals or multiples of regular intervals, said sheet being divided into block spaces, one or more of said spaces holding the associated lines of a group, with the first line of a group always at the top of a new block, means for printing lines of numerical and alphabetic data, a feeding means for said sheet, line spacing devices cooperating with said feeding means for feeding the sheet for every printing operation, means for detecting the difference between groups of unrelated items to denote the end of a group, means under control of said detecting means for initiating operation of said line spacing devices, and a plurality of line space stopping means operable with said line spacing devices and advanced thereby, said stopping means being made active in succession and selectively effective according to the number of associated item lines in a group, the first stopping means cooperating with said spacing initiating means and spacing devices and being effective to stop the spacing devices at the first line of a new block when a group of items requires less than a block space, and the second of said stopping means controlling said space initiating means and spacing devices to stop the spacing devices at the first line of a third block when a group of items requires more than one block space.

7. In a record controlled machine for printing amount and address data on a check strip divided into check forms, said records being arranged in groups of related amount and address records of separate accounts, indicia on said records representing the account number, amount and address data, means for sensing the amount and address indicia on said records, devices under control of said sensing means for printing amounts and addresses on said check strip, a feeding means for said strip, line spacing devices cooperating with said feeding means for feeding said strip for every printing operation, means for sensing a change in account number indicia, means for detecting special perforations distinguishing amount records from address records, long feeding means cooperating with said feeding means for feeding said strip from check to check, control means under control of said account number sensing means and said special perforation detecting means for initiating operation of the amount printing devices, the spacing devices and the long feeding means in succession when a change in account occurs while sensing the amount records of one group, said control means also disabling the alphabet printing devices and initiating operation of said spacing devices and long feeding means when an account change occurs while sensing grouped address records.

8. In a machine for printing on a sheet divided into forms, each comprising a plurality of block spaces for grouping the printed data, means for printing groups of item lines on said sheet, a feeding means for said sheet, means cooperating with said feeding means for line spacing said sheet for every printing operation, means for suspending operation of said printing means after printing items of a group, means under control of said printing means and effective upon suspension of printing, means under control of said suspending means and including said means effective as an incident to suspension of printing for initiating operation of said line spacing means to skip unused parts of block spaces, means operated by said line spacing means and advanced thereby for determining block space intervals, means cooperating with said spacing means and said determining means for stopping said line spacing at regular block space intervals, a line counting step switch for regulating the degree of extra space fed at the end of a form, means including block counting devices for calling said switch into operation at the end of a form, means under control of said block space determining means for operating said block counting devices, means for operating said switch in synchronism with said line spacing means, means for resetting said switch and block counting devices, and means under control of said switch for controlling said spacing means for terminating spacing operation after a predetermined number of spacing operations are imparted to the sheet to carry it from form to form.

GEORGE F. DALY.
FREDERICK N. ESHER.